US012608627B2

(12) United States Patent
Cheng et al.

(10) Patent No.: US 12,608,627 B2
(45) Date of Patent: Apr. 21, 2026

(54) COMPUTER-BASED SYSTEMS CONFIGURED FOR MACHINE-LEARNING CONTEXT-AWARE CURATION AND METHODS OF USE THEREOF

(71) Applicant: Capital One Services, LLC, McLean, VA (US)

(72) Inventors: Lin Ni Lisa Cheng, New York, NY (US); Shabnam Kousha, Washington, DC (US); Tyler Maiman, Melville, NY (US); Asher Smith-Rose, Midlothian, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 677 days.

(21) Appl. No.: 17/873,891

(22) Filed: Jul. 26, 2022

(65) Prior Publication Data

US 2024/0037417 A1 Feb. 1, 2024

(51) Int. Cl.
*G06N 5/022* (2023.01)
*H04L 41/50* (2022.01)

(52) U.S. Cl.
CPC .............. *G06N 5/022* (2013.01); *H04L 41/50* (2013.01)

(58) Field of Classification Search
CPC ................................ G06N 5/022; H04L 41/50
See application file for complete search history.

(56) References Cited

U.S. PATENT DOCUMENTS

| | | | |
|---|---|---|---|
| 11,308,536 B1 * | 4/2022 | Adler ................. | G06Q 30/0629 |
| 2016/0292778 A1 * | 10/2016 | Zamer ................. | G06Q 30/016 |
| 2021/0133856 A1 * | 5/2021 | Rosenthal .......... | G06Q 20/3224 |
| 2021/0365883 A1 * | 11/2021 | Marbut, Jr. .......... | G06Q 10/087 |
| 2023/0394351 A1 * | 12/2023 | Sundar ..................... | G06N 3/09 |

* cited by examiner

*Primary Examiner* — Sherrod L Keaton
(74) *Attorney, Agent, or Firm* — Greenberg Traurig, LLP

(57) ABSTRACT

Systems and methods of context-aware caller identification via machine learning techniques are disclosed. In one embodiment, an exemplary computer-implemented method may comprise: obtaining a trained activity completion time estimation machine learning model that determines activity completion time prediction data for an activity of an entity; receiving, from a first computing device of a user, current entity-specific device-executed user activity data of a current entity-specific user activity associated with a user and an entity; receiving from a second computing device associated with the particular entity, current user-specific entity activity data associated with a current user-specific entity activity, related to the current entity-specific user activity; utilizing the trained activity completion time prediction machine learning model to determine current user-specific entity activity completion time prediction data for the current user-specific entity activity; and determining a current displaying context to notify the user of the current user-specific entity activity completion time prediction.

20 Claims, 9 Drawing Sheets

100

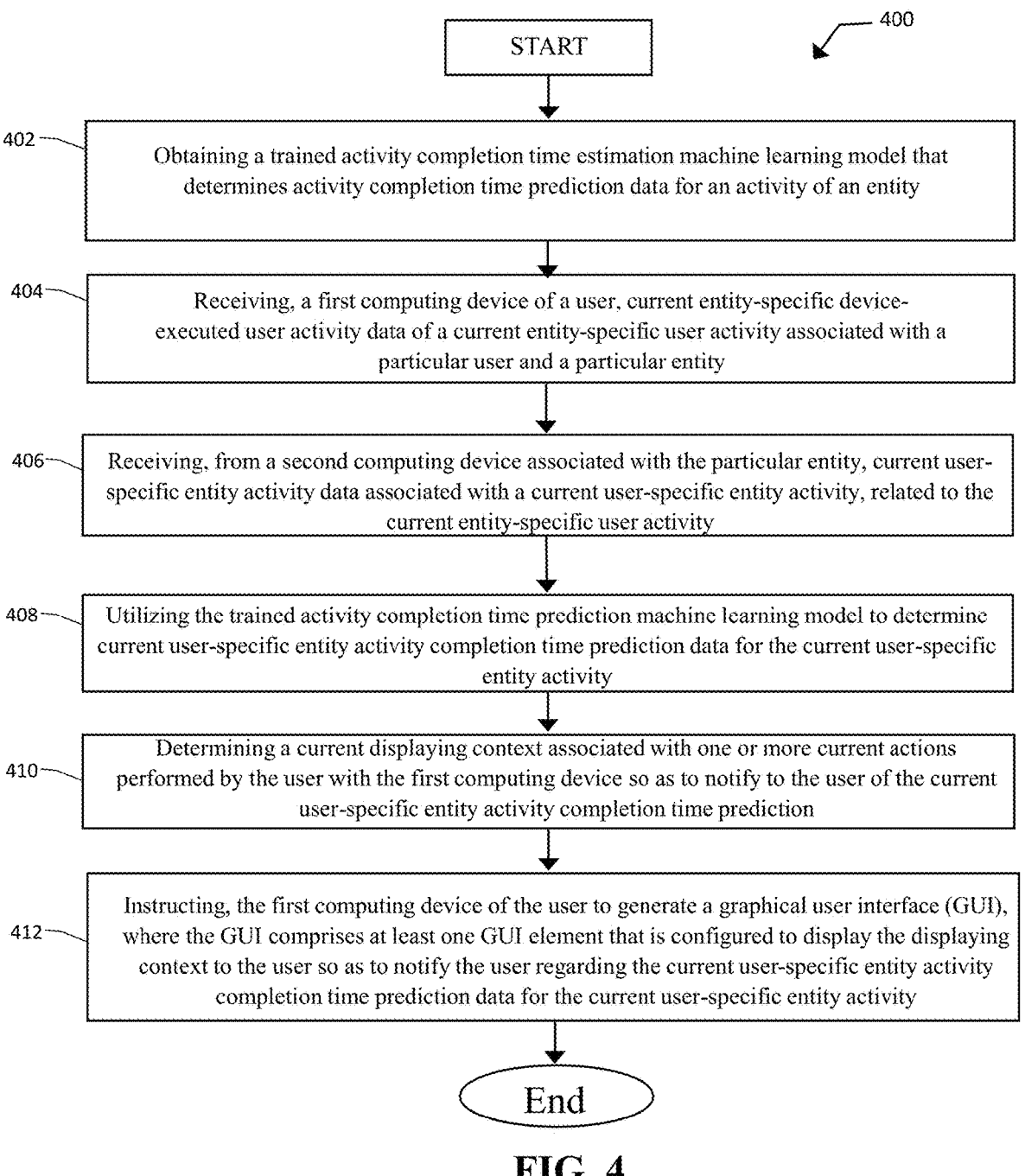

400

START

402 — Obtaining a trained activity completion time estimation machine learning model that determines activity completion time prediction data for an activity of an entity 404 — Receiving, a first computing device of a user, current entity-specific device-executed user activity data of a current entity-specific user activity associated with a particular user and a particular entity 406 — Receiving, from a second computing device associated with the particular entity, current user-specific entity activity data associated with a current user-specific entity activity, related to the current entity-specific user activity 408 — Utilizing the trained activity completion time prediction machine learning model to determine current user-specific entity activity completion time prediction data for the current user-specific entity activity 410 — Determining a current displaying context associated with one or more current actions performed by the user with the first computing device so as to notify to the user of the current user-specific entity activity completion time prediction 412 — Instructing, the first computing device of the user to generate a graphical user interface (GUI), where the GUI comprises at least one GUI element that is configured to display the displaying context to the user so as to notify the user regarding the current user-specific entity activity completion time prediction data for the current user-specific entity activity End

FIG. 4

COMPUTER-BASED SYSTEMS CONFIGURED FOR MACHINE-LEARNING CONTEXT-AWARE CURATION AND METHODS OF USE THEREOF

COPYRIGHT NOTICE

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to curate information to enhance communications such as contextually providing information including, but not limited to, user-specific contextual information, or caller ID information augmented with call receivers' specific contextual information.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one exemplary technological problem lies in how to determine contextual data pertaining to multiple parties interacting over activities (e.g., transaction events) despite the dis-connectedness in the nature of such data, as well as how to integrate further contextual information computed, predicted, or otherwise derived from such data at the right context to respective parties to transactions.

SUMMARY OF DESCRIBED SUBJECT MATTER

In some embodiments, the present disclosure provides various exemplary technically improved computer-implemented methods involving curation and integration of transaction-related information for contextual displaying, the method including steps such as: obtaining, by one or more processors, a trained activity completion time estimation machine learning model that determines activity completion time prediction data for an activity of an entity based on at least one pattern between entity-specific user activity data of at least one user and entity activity data of the entity, where the entity-specific user activity data is indicative of past device-executed interactions by the at least one user with the entity, where the activity completion time prediction data is indicative of when the entity activity is to be completed by the entity; receiving, by the one or more processors, from a first computing device of a user, current entity-specific device-executed user activity data of a current entity-specific user activity associated with a particular user and a particular entity, where the current entity-specific user activity is associated with a current entity activity to be completed at a future point of time by a particular service provider associated with the particular entity, and where the current entity-specific device-executed user activity data is indicative of one or more current actions of the user with the first computing device; receiving, by the one or more processors, from a second computing device associated with the particular entity, current user-specific entity activity data associated with a current user-specific entity activity, related to the current entity-specific user activity, where the current user-specific entity activity data is associated with data of the particular entity, data of the particular service, or both; utilizing, by the one or more processors, the trained activity completion time prediction machine learning model to determine current user-specific entity activity completion time prediction data for the current user-specific entity activity based at least in part on: the current entity-specific device-executed user activity data, and the current user-specific entity activity data; determining, by the one or more processors, a current displaying context associated with one or more current actions performed by the user with the first computing device so as to notify to the user of the current user-specific entity activity completion time prediction; and instructing, by the one or more processors, the first computing device of the user to generate a graphical user interface (GUI), where the GUI includes at least one GUI element that is configured to display the displaying context to the user so as to notify the user regarding the current user-specific entity activity completion time prediction data for the current user-specific entity activity.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 is a flowchart illustrating an exemplary process related to curation and integration of contextual information (e.g., transaction-related contextual information), consistent with exemplary aspects of certain embodiments of the present disclosure.

DETAILED DESCRIPTION

Figure 1:
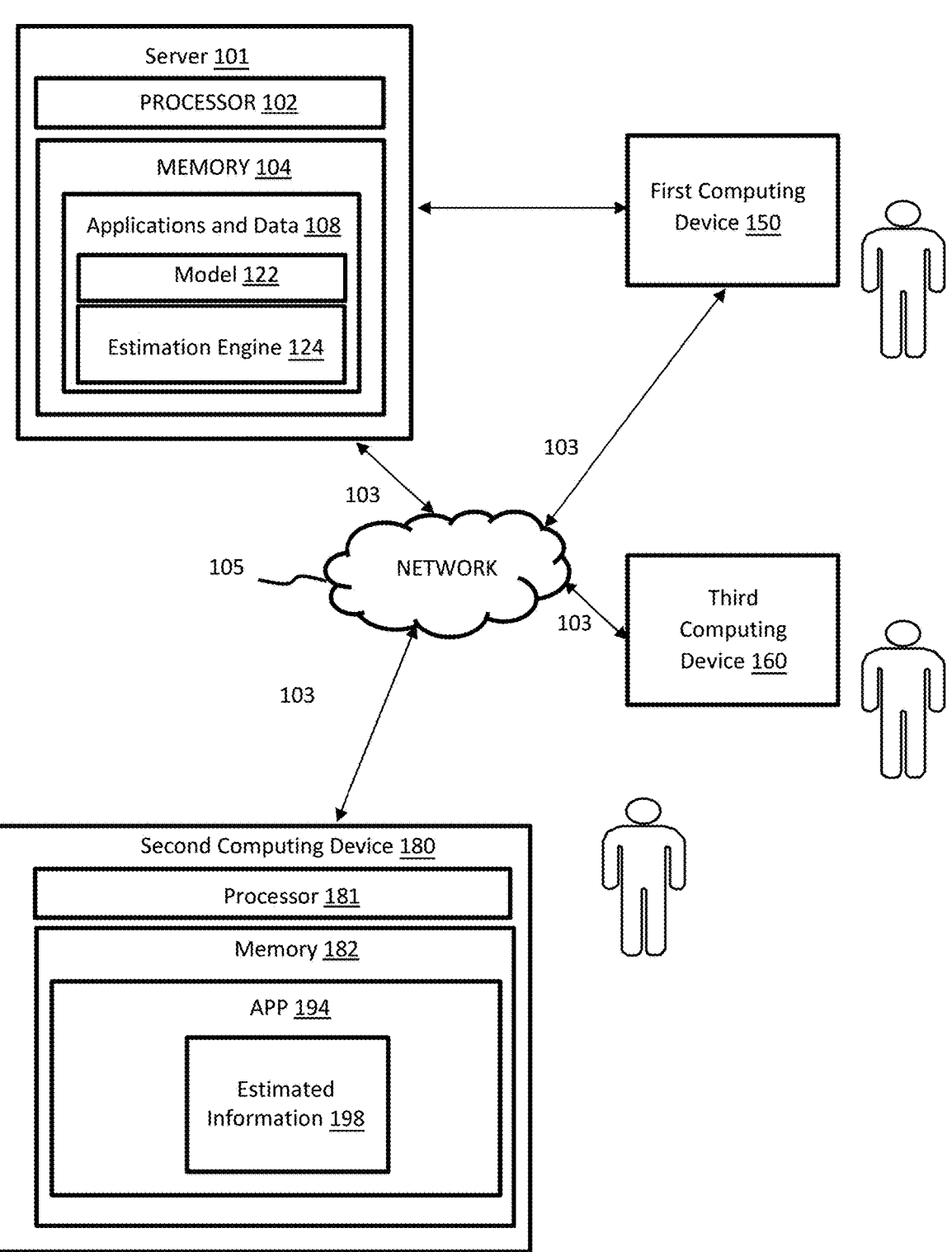
FIG. 1 is a block diagram of an exemplary system and/or platform illustrating aspects of curation and integration of contextual information (e.g., transaction-related contextual information), consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the diversity of and intelligence gleaned from various communication events, activities (e.g., transaction events) and at the same time to leverage advanced data processing capabilities, various embodiments of the present disclosure provide for improved computer-based platforms or systems, improved computing components and devices configured for one or more practical technological improvements involving: detecting phone calls received at computing devices of users, dynamically curating and integrating user-specific entity activity data (e.g., contextual information) for contextual displaying at various communication portals, as well as generating intelligence (e.g., machine learning models, etc.) empowered by correlating various user activities (e.g., transaction events) with respective user activity information, merchant activity information, communication events, service provider profile information and/or service provider contextual information, merchant profile information and/or merchant contextual information to, for example, automate the determination of estimated time to complete for user orders with merchants, as well as the transaction-specific contextual information for providing the estimated time, and for augmenting caller ID information in associative calls with enhanced efficiency, accuracy, relevancy, accessibility, and privacy control.

Various embodiments disclosed herein may be implemented in connection with one or more entities that provide, maintain, manage, and/or otherwise offer any services involving various activity data (e.g., transaction data) and/or communication(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account known to those skilled in the art. For example, a transaction account (e.g., credit card account debit card account, mobile pay account, royalty point account, banking account, trading account, virtual credit card account, bitcoin account, etc.) of a user may be set up and updated in association with various respective user profile information such as, one or more mobile phone numbers of the user, a home address of the user, a work address of the user, and the like.

For purposes of illustration, data structures and/or operations specific to phone calls may be used herein as non-limiting examples to describe some embodiments of the present disclosure. Various aspects of various disclosed technological improvements may apply to communications at various modalities. For example, the user-specific entity activity data may be used to augment record(s) associated with identification(s) of a user's (e.g., merchants, service providers), for example, email address, chatting account, social media account, web pages, and so on. Correspondingly, the user-specific entity activity data may be dynamically displayed to another user in receipt of an incoming communication initiated by and/or in interactions with the user via various communication modalities. By way of non-limiting examples, such communications may be in the forms of an SMS, an MMS, an email, a voice message, a chatting message, a social media message, a push message of an application, an application, a web page, and the like, not limited by the embodiments illustrated herein.

FIG. 1 depicts an exemplary computer-based system 100 illustrating aspects of technologically improved curation and integration of contextual information via utilization of at least one machine learning technique, in accordance with one or more embodiments of the present disclosure. An exemplary system 100 may include at least one server 101, and at least one first computing device 150 associated with a first user, which may communicate 103 over at least one communication network 105. In some embodiments and in optional combination with one or more embodiments described herein, the system 100 may further include and/or be operatively connected and/or be in communication (e.g., electronic communication, telecommunication) with at least one second computing device 180 associated with a second user, and/or at least one third computing device 160 associated with a third user. The second computing device 180, the third computing device 160, and the first computing device 150 may also communicate with each other via the communication network 105 to, for example, receive phone call(s), SMS message(s), MMS message(s), chat application message(s), social media message(s), and the like.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be standalone, or it may be part of a subsystem, which may, in turn, be part of a larger computer system. In some embodiments, server 101 may be associated with an entity such as a financial institution, such as a credit card company that services an account of the user, and thereby having access to transactions performed by various users in addition to their respective account information. For example, the second user (e.g., a customer) may incur an activity (e.g., a transaction) with the third user (e.g., a merchant), using a transaction card issued by the credit card company, at the third computing device 160 of the third user (e.g., either online or associated with a point of sale (POS) device of the merchant) via placing an order for a good, a service, or some combination thereof. As illustrated with more details below, in some embodiments, the first user may be associated with a delivery portion associated with the activity (e.g., transaction) performed by the second user with the third user.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with curation and integration of contextual information, in conjunction with or independent of curation and integration of contextual information functionality implemented at the first computing device 150, the second computing device 180, and/or the third computing device 160.

In some embodiments, the features and functionality may include operations such as: obtaining training data (e.g., training information of a plurality of entities, training activity information associated with a plurality of activities associated with the plurality of entities, training entity-specific user activity data of a plurality of users associated with the plurality of activities, training phone number information of a plurality of phone numbers associated with a plurality of service providers, the plurality of service providers associated with delivery portions of the plurality of activities, training timing information associated with one or more communications from the plurality of service providers in association with the delivery portions of the plurality of activities, training timing information associated with the plurality of activities, training profile information and/or contextual information associated with the plurality of service providers, training contextual information associated with the plurality of activities, and/or training profile information and/or contextual information associated with the plurality of entities); obtaining a trained activity completion time estimation machine learning model that determines activity completion time indicative of when an entity activity is to be completed by the entity; receiving an indicator identifying a permission by the second user to detect phone calls, emails, messages, and/or other communications received at the second computing device of the second user; receiving an indication that at least one communication is received by the second user from the first user or the third user; receiving activity (e.g., transactional) information of at least one activity (e.g., transaction) associated with the second user and the third user; receiving entity activity data from the third user; utilizing the trained activity completion time estimation machine learning model to determine, based at least in part on the user-specific entity activity data and/or the entity-specific user activity data, user-specific entity activity completion time prediction data; determining a displaying context associated with one or more actions performed by the second user to notify the second user of the determined completion time prediction data; and instructing the second computing device to display, at the displaying context, to the second user the user-specific entity activity completion time prediction data. In some embodiments not shown herein, the features and functionality of the server 101 may be partially or fully implemented at the second computing device 180, and/or the third computing device 160, and/or the first computing device 150 such that the illustrative process to provide curation and integration of contextual information may be performed partially or entirely on the second computing device 180, the third computing device 160, and/or the first computing device 150.

In some embodiments, the application(s) and data 108 may include an exemplary activity completion time estimation machine learning model 122. In some embodiments, the activity completion time estimation machine learning model 122 may be trained at the server 101. In other embodiments, the activity completion time estimation machine learning model 122 may be trained by another entity with the training data provided by another entity, and/or with the training data provided by server 101. In some embodiments, the activity completion time estimation machine learning model 122 may also be trained and re-trained at the second computing device 180, the third computing device 160, and/or the first computing device 150. In the latter cases, the activity completion time estimation machine learning model 122 may be trained and/or re-trained with training data specific to the second user at the second computing device 180, and/or with training data specific to the third/first user at the third computing device 180/first computing device 150.

Various machine learning techniques may be applied to train and re-train the activity completion time estimation machine learning model 122 with training data and feedback data, respectively. In some embodiments, the feedback data may include data obtained via an automatic feedback, a manual feedback, or some combination thereof. By way of non-limiting examples, the feedback data may be obtained automatically by detecting communications associated with deliveries (e.g., from delivery agents) and utilizing the time lapses between the respective activities (e.g., transactions for orders associated with delivery portions) and the detected communications as the feedback data. In some embodiments, the feedback data may be obtained manually by prompting users to provide manually verified information with regard to their received communications (e.g., asking the user to confirm whether a communication is associated with a delivery portion of an activity (e.g., a transaction), asking the user whether he or she has received the delivery associated with an activity, asking the user when (how long ago) he or she has received the delivery associated with an activity, and the like. In some embodiments, the training data may include the feedback data described above. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

a. Define Neural Network architecture/model, b. Transfer the input data to the exemplary neural network model, c. Train the exemplary model incrementally, d. determine the accuracy for a specific number of timesteps, e. apply the exemplary trained model to process the newly-received input data, f. optionally and in parallel, continue to train the exemplary trained model with a predetermined periodicity.

In some embodiments and, optionally, in combination with any embodiment described above or below, the exemplary activity completion time estimation machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include an estimation engine 124 that may be programmed to execute the exemplary activity completion time estimation machine learning model 122. In some embodiments, the estimation engine 124 may receive, as input, entity-specific user activity information associated with the second user. As an output, the estimation engine 124 may utilize the activity completion time estimation machine learning model 122 to determine a user-specific entity activity completion time prediction for displaying to the second user at a context dynamically determined according to the one or more actions performed by the second user on the second computing device 180 in association with the entity-specific user activity of the second user.

Still referring to FIG. 1, an illustrative second computing device 180 associated with the second user may include: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the second user for a permission to detect communications via the second computing device 180 (e.g., phone calls, SMS, emails); receiving data from the execution of other computing routines executing on the second computing device 180 (e.g., a web browser extension, an ordering/delivery service app (e.g., DoorDash app), etc.); detecting communications via the second computing device 180 according to the permission obtained from the second user; monitoring the content of the detected communication at the second computing device 180; receiving, and/or storing estimated information 198 from the server 101; and triggering the second computing device 180 into displaying the estimated information 198 to the second user at a determined displaying context.

In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the second computing device 180. For instance, such application may be configured to detect a variety of communications of the second user at the second computing device 180, intercept those communications at the second computing device 180, monitor those communications at the second computing device 180, and/or interject one or more suitable controls (e.g., user operable controls) over those communications at the second computing device 180. In some embodiments, such application may be configured to obtain information of the communication transmitting party(ies) (e.g., the calling phone number), information of the communication (e.g., the calling time of a phone call), the content of the communication (e.g., the identity of an SMS sending entity, the content of the conversation of a phone call). In some embodiments, such an application may be configured to obtain permissions from the second user in order to execute all or part of the exemplary functionality described above. In some embodiments, the application 194 may be configured to execute on the first computing device 150 and/or the third computing device 160 as well.

In some embodiments, for the purpose of simplicity, features and functionalities associated with the exemplary activity completion time estimation machine learning model 122 (e.g., training, re-training, etc.) are illustrated as implemented by components of server 101. It should be noted that one more of those activity completion time estimation machine learning model-related aspects and/or features may be implemented at or in conjunction with the second computing device 180 and/or the third computing device 160. For example, in some embodiments, the activity completion time estimation machine learning model 122 may be partially trained at the server 101 with, for example, other users' entity-specific user activity information (e.g., transaction information) and corresponding phone call events associated with respective delivery portions thereof, and in turn transmitted to the second computing device 180 and/or the third computing device 160 to be fully trained with, for example, the second user specific activity information and/or the third user specific activity information and phone call events associated with the respective delivery portions thereof. In another example, the converse may be performed such that the machine learning model 122 may be initially trained at the second computing device 180 and/or the third computing device 160 and subsequently transmitted to the server 101 for application and/or further training with training data from other users.

The illustrative third computing device 160 associated with the third user may include: one or more processors (not shown) and a non-transient computer memory (not shown). Memory may store instructions that, when executed by the one or more processors, perform various procedures, operations, or processes consistent with disclosed embodiments. In one embodiment, the memory may include an application (not shown), when executed by the one or more processors, may perform operations such as: receiving entity-specific user activity information from the second user; receiving entity-specific user activity information from the first user; and/or transmitting entity-specific activity information to the server 101, among other functionality.

The illustrative first computing device 150 associated with the first user may include: one or more processors (not shown) and a non-transient computer memory (not shown). Memory may store instructions that, when executed by the one or more processors, perform various procedures, operations, or processes consistent with disclosed embodiments. In one embodiment, the memory may include an application (not shown), when executed by the one or more processors, may perform operations such as: receiving entity-specific second user activity information from the third user; and transmitting first user-specific activity information to the server 101, the third computing device 160, the second computing device 180, among other functionality.

Various embodiments associated with FIG. 1 and related disclosure herein solve a technical problem of determining dis-connected contextual data pertaining to multiple parties interacting over activities (e.g., transaction events) as well as integrating contextual information further computed, predicted, or otherwise derived from such data at the right context to respective parties to transactions. Aspects of the disclosed curation and integration of contextual information yield more accurate, informative, efficient and otherwise improved utilization of both processing and communication resources, such as via leveraging the exclusive, private access to comprehensive user data (e.g., with timing information in high precision) (e.g., both training and real user communication events, activities (e.g., transaction events), feedback events, etc.) to train and re-train a machine learning model, using the trained machine learning model to determine at least user-specific entity activity completion time prediction data. As a result, the user can be facilitated with a variety of contextual information related to transaction(s) thereof, and be guarded from true spam imposing telecommunication security issues in an improved manner that is enabled to differentiate delivery calls from true spam utilizing the predicted contextual information.

While only one server 101, first computing device 150, second computing device 180, third computing device 160, and network 105 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For example, in some embodiments, the features and functionality of the server 101 may be partially, or fully implemented at the first computing device 150 and/or the second computing device 180 and/or the third computing device 160. In another example, in some embodiments, the features and functionality of the second computing device 180 may be partially, or fully implemented at the server 101. In yet another example, in some embodiments, the features and functionality of the first computing device 150/the third computing device 160 may be fully or partially implemented at the second computing device 180, and vice versa, not limited by the embodiments illustrated herein.

Figures 2A, 2B:
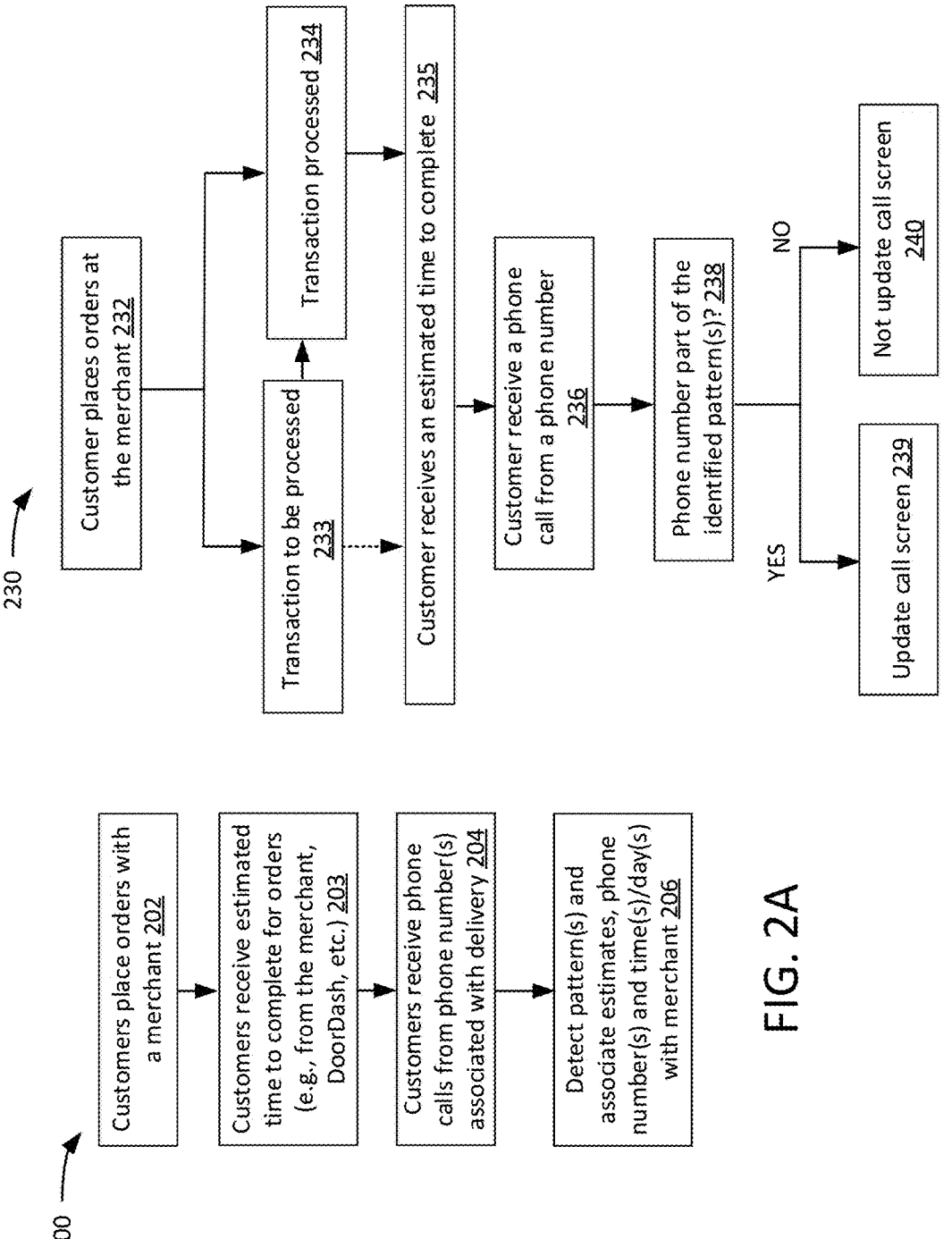
FIGS. 2A and 2B are diagrams illustrating an exemplary process involving aspects and features associated with curation and integration of contextual information (e.g., transaction-related contextual information), consistent with exemplary aspects of certain embodiments of the present disclosure.

FIGS. 2A and 2B are diagrams illustrating an exemplary curation and integration of contextual information using one or more machine learning techniques, consistent with exemplary aspects of certain embodiments of the present disclosure. In this illustrated embodiment, an exemplary contextual information curation and integration system providing contextual information (e.g., user-specific entity activity data) for transactions performed at a device of a customer may include a training phase 200 and a prediction (e.g., execution) phase 230. In the training phase 200, a machine learning model (e.g., the activity completion time estimation machine learning model 122) may be trained with various training data observed or otherwise obtained for a multitude of customers' activities, merchants' activities, service providers' activities, and phone call events associated therewith. In prediction phase 230, the activity completion time estimation machine learning model, trained in the training phase 200, may be utilized to predict contextual information related to user-specific entity activity (e.g., customer-specific orders with the merchant). For example, the trained activity completion time estimation model may be applied to predict a completion time for the customer-specific orders with the merchants. In some embodiments, the completion time may include two segments: a first completion time indicating the order is complete at the merchant (e.g., ready for pick-up either by the customer or a service provider (e.g., a delivery person)), and a second completion time indicating when the customer can expect a delivery arrival call from the service provider. Here, the customer(s) may be the second user of FIG. 1, the device may comprise the second computing device 180, the merchant(s) may be the third user at the third computing device 160 of FIG. 1, and the call(s) associated with the delivery portions of the transacted goods or services may be placed by the first user from the first computing device 150 as illustrated in FIG. 1.

In the illustrative embodiment shown in FIG. 2A, customers may place (202) one or more orders (e.g., transactions) at a merchant who may operate on-line, in a physical store, or in some combination thereof. The orders may include those that require delivery services (e.g., food orders, grocery orders, gift orders, ride hailing, etc.) and those that may not require delivery services (e.g., food orders associated with pick up options, merchandise orders with in-store pick up options, a purchase of gasoline at a gas station, etc.). Here, for the purpose of training (and/or re-training) the activity completion time estimation machine learning model is used to predict user-specific entity activity contextual data such as an order completion time including, for example but not limited to, when the order is completed by the merchant, and/or when a call is to be expected from a phone number probably unknown to the customer but associated from a delivery portion of the order above described. In some embodiments, the contextual data may include an amount of time summing the first time segment and the second time segment as the estimated time to complete an order. In some embodiments, the contextual data may include just the first time segment as the estimated time to complete an order that does not need a delivery service. In some embodiments, the contextual data may include both the first time segment and the second time segment as the detailed break-down information for the estimated time to complete an order. In some embodiments, the first time segment may include one or more items of contextual data pertaining to estimating the time to complete an order. For example, the first time segment may include information such as, but not limited to, how many orders are still pending with the merchant ahead of an order of the customer, how long each of those pending orders are estimated to be completed, and the like. For another example, the first time segment may include statistical information related the completion of an order. For example, the first time segment may include statistics regarding what is the average amount of time it takes the merchant to complete an order (e.g., a similar order, any order) during the particular time window when the customer places an order, what is the average number of orders the merchant receives in that time window, and the like. Similarly, the second time segment may include one or more items of contextual data representing information such as how many delivery people are en route delivering how many orders for the merchant, how many delivery stops the delivery person servicing the particular order of the customer has, what is the average amount of time it takes a delivery person to deliver to the location associated with the delivery (e.g., the neighborhood of the customer) during the time window, and the like. In some embodiments, such contextual data can be determined multiple times (e.g., updated estimation) depending on, for example, the availability of additional information that can impact the prediction, separately or in addition to being predicted a single time/displayed to the customer a single time.

In some embodiments, information of entity-specific user activity data (e.g., orders of customers) may be included in the training data. By way of non-limiting examples, the information may include various activity information such as, but not limited to, a time of an activity (e.g., transaction), a merchant name of the activity (e.g., transaction), an activity (e.g., transaction) amount, the items ordered, the address of the merchant, the address of a delivery address, and the like. Such activity information may be available to a banking system that processes the activity incurred by customers placing the one or more orders at the merchant. For instance, activity (e.g., transaction) information for a given activity (e.g., transaction) may be received at the time a charge is posted and/or authorized (e.g., when a credit card is swiped, a digital card is scanned for payment at a restaurant, when an on-line payment is made to purchase a product/service, etc.) in association with the third computing device 160.

As shown in this illustrative embodiment, customers may receive (203) estimated time to complete the orders as a result of placing the orders with the merchants at 202. In one example, when interacting with the merchant on a web page (e.g., DoorDash web page, the merchant's own web page), the customers may be provided with an estimated time to complete the orders at the web page itself (e.g., DoorDash web page or the merchant's web page can display an estimated pick up time and delivery time with or without a customer selecting items and prior to checking out). In another example, interacting with the merchant on an application (e.g., DoorDash app), the customers may be provided with an estimated time for delivery orders and pick up orders once the customer has identified the merchant (with the customer's address known at the app), and/or selected items for checking out. In yet another example, once the customers have transacted with the merchant to purchase the selected item, another estimation for a delivery time/pick up time may be provided to the customer. In yet another example, the customers may call the merchant to place the orders and thus be informed by the merchant itself with an estimated time to completion. Here, information related to these estimations may be included in the training data. By way of non-limiting examples, the estimated information may include various data such as, but not limited to, a time associated with the estimation, detailed information of the orders associated the estimation, merchant information associated with the estimation, service provider information associated with the estimation, and the like. Such call related information may be, for example, captured by the merchant and/or third party providers (e.g., DoorDash) and/or the customer/service provider and reported to the server 101.

For those orders requiring delivery portions to fulfill, the customers may receive (204) phone calls from the phone numbers associated with the delivery portions of the orders. In some embodiments, an activity (e.g., transaction) may be incurred prior to the delivery portion of an order being fulfilled. For example, for an order of food or merchandises, the customers may incur the transactions corresponding to the orders prior to receiving the above-described phone calls associated with the delivery service that is to complete the orders. In other embodiments, an activity (e.g., transaction) may be incurred after the delivery portion of an order being fulfilled. For example, for orders of services (e.g., Uber rides), the customers may incur a activity (e.g., transaction) for the service ordered after the ride is completed at its scheduled destination, which happens after the customers receiving the above-described phone calls associated with the delivery portion of the service ordered. Here, information related to these phone calls may be included in the training data. By way of non-limiting examples, the call related information may include various information such as, but not limited to, a time of a call, a phone number from which a call is placed, the content of the conversation of a call, and the like. Such call related information may be, for example, captured by an application such as the application 194 executing on the devices of the customers with the customers' permissions, and reported to the server 101.

In this illustrative embodiment, once the information of the orders, the estimations, and the phone call events are captured over various customers' ordering interactions with the merchant, one or more patterns characterizing the observed orders, the estimations and the phone call events associated therewith may be detected (206). In some embodiments, such detection may be performed using one or more machine learning techniques as described above. In some implementations, the detected pattern(s) may be stored such that the estimations and/or the phone numbers associated with the delivery portions may be recorded with various information such as the order details, the respective delivery times, delivery days, deliver-to addresses, deliver-from addresses, the information of the merchant, and the like. According to other aspects of the embodiments, various profile and/or contextual information may be observed or otherwise obtained in association with the above described orders, estimations and/or phone call events. For example, profile/contextual information of the customers (e.g., the second user of FIG. 1), the merchant (e.g., the third user of FIG. 1), delivery service providers (e.g., the first user of FIG. 1), general contextual information (e.g., weather, traffic, holidays, events, regulations that may impact the estimation) may be obtained and included as part of the training data to train the activity completion time estimation model as well, the details of which is described with reference to FIG. 4, below, to obtain a trained activity completion time estimation machine learning model.

The system in the prediction phase 230 may apply the trained activity completion time estimation machine learning model to predicate user-specific entity activity completion time. In some embodiments, the system may detect notifications and data pertaining to a customer's one or more actions or interactions in association with incurring entity-specific user activities (e.g., ordering at a web page, ordering at an application, ordering via a phone call, authorized or transacted transactions associated with the orders). In one example, such notifications and data may be obtained via the illustrative second computing device 180 and/or third computing device 160. In some embodiments, the system may further detect communications such as phone calls received at the device of the customer using an illustrative application such as the application 194, with the permission of the customer. In this example, the customer places (232) an order(s) at the merchant, which in turn causes: either an activity (e.g., a transaction) to be processed (233) (e.g., with item(s) to be checked out), or an activity (e.g., a transaction) processed (234) (e.g., with item(s) checked out and paid for). In both contexts, the customer can receive (235) an estimated time to complete the order placed at 232. According to some embodiments, the system may apply the received entity-specific user activity data and/or the user-specific entity activity data to the trained activity completion time estimation machine learning model to predict the order completion time. In one example, the system may determine the estimated completion time according to the pattern(s) identified during the training phase 200. In some embodiments, the identified pattern(s) used may be the pattern(s) identified based on orders from various customers with the same merchant. In other embodiments, the identified pattern(s) used may include the pattern(s) identified based on orders from various customers with one or more merchants other than or including the merchant involved in the training phase 200. As a result, and as shown here in FIG. 2B, once determining the estimated completion time, the system may communicate or otherwise provide the determined estimation to the device of the customer. Such estimation of the time to complete may likewise include a first time segment and/or a second time segment, as illustrated above. More details with regard to examples associated with the customer receiving the estimation are described with reference to FIGS. 3A-3D and 4, below.

Next, when the order is associated with a delivery portion, the customer may receive (236) a phone call from a phone number that is unknown to the customer but associated with the service provider fulfilling the delivery portion of the transacted order. Even though the system may provide the customer with the estimated completion time at both step 233 and step 234, the customer needs to commit (or authorize) the activity (e.g., transaction) to navigate from step 233 to step 234 in order for the delivery portion to be serviced subsequently via step 236. At this point of time, in some embodiments, already notified with the activity and equipped with an estimation of completion time, the system may be triggered to determine whether this particular phone call is associated with the transactions processed in step 234. In this illustrative example, the system may verify (238) the particular incoming call against the pattern(s) identified during the training phase 200. As a result, and as shown here in FIG. 2B, when determining that the particular incoming call is associated with the activity of the customer, e.g., the delivery portion of the order incurring the transaction, the system may instruct the device of the customer to update (239) a call screen to notify the customer of the determination. On the other hand, when determining that the particular incoming call is not associated with the activity (e.g., transaction) of the customer, e.g., the delivery portion of the order incurring the transaction, the system may instruct the device of the customer not to update (240) a call screen. Various embodiments herein may be configured such that any suitable information relating to the order, the transaction, the merchant, the delivery service provider, and the like may be communicated to the device of the customer as part of the information to augment the caller ID information displayed at the calls screen in step 239. More details are described with reference to FIG. 3D, below.

FIGS. 3A-3D are diagrams illustrating exemplary graphical user interfaces (GUIs) involving aspects associated with curation and integration of contextual information, consistent with exemplary aspects of certain embodiments of the present disclosure. In some embodiments, the GUIs may be provided by an illustrative application (e.g., the application 194 executing on the second computing device 180 of FIG. 1, a web browser extension to a web browser application executing on the second computing device 180, or a messaging application executing on the second computing device 180) and shown on a display of a mobile device (e.g., the second computing device 180 of FIG. 1). In some embodiments, prior to the GUIs being displayed to the user at the mobile device, one or more actions of the user in association with performing an entity-specific user activity (e.g., selecting menu items for purchase with a merchant, placing an order incurring a transaction with a merchant) may be detected as a triggering condition to cause the application into notifying the user with the curated contextual information in a manner integrated to the user's actions and interactions on the mobile device. In other embodiments, the application may be executing on the mobile device (e.g., detecting communications received or initiated at the mobile device with the permission from the user) regardless of whether there has been a triggering condition detected. In some implementations, a triggering condition may include an indication that the user is about to incur an activity (e.g., a transaction) with a merchant, has incurred an activity (e.g., a transaction) with a merchant, the activity (e.g., transaction) to be fulfilled with a service portion.

Some embodiments of the present disclosure may be configured such that a displaying context can be determined relative to the user actions and interactions to notify the curated contextual information. As illustrated in the non-limiting examples of FIGS. 3A-3C, a displaying context can be determined relative to the user action and/or interactions via the application, independent of the application but integrated to a communication modality of the user at the mobile device, and the like. In some implementations, the displaying context can be determined to include one or more of a timing displaying context, an application as a displaying context, a GUI positional displaying context within the GUI(s) of an application, and so on.

Figure 3A:
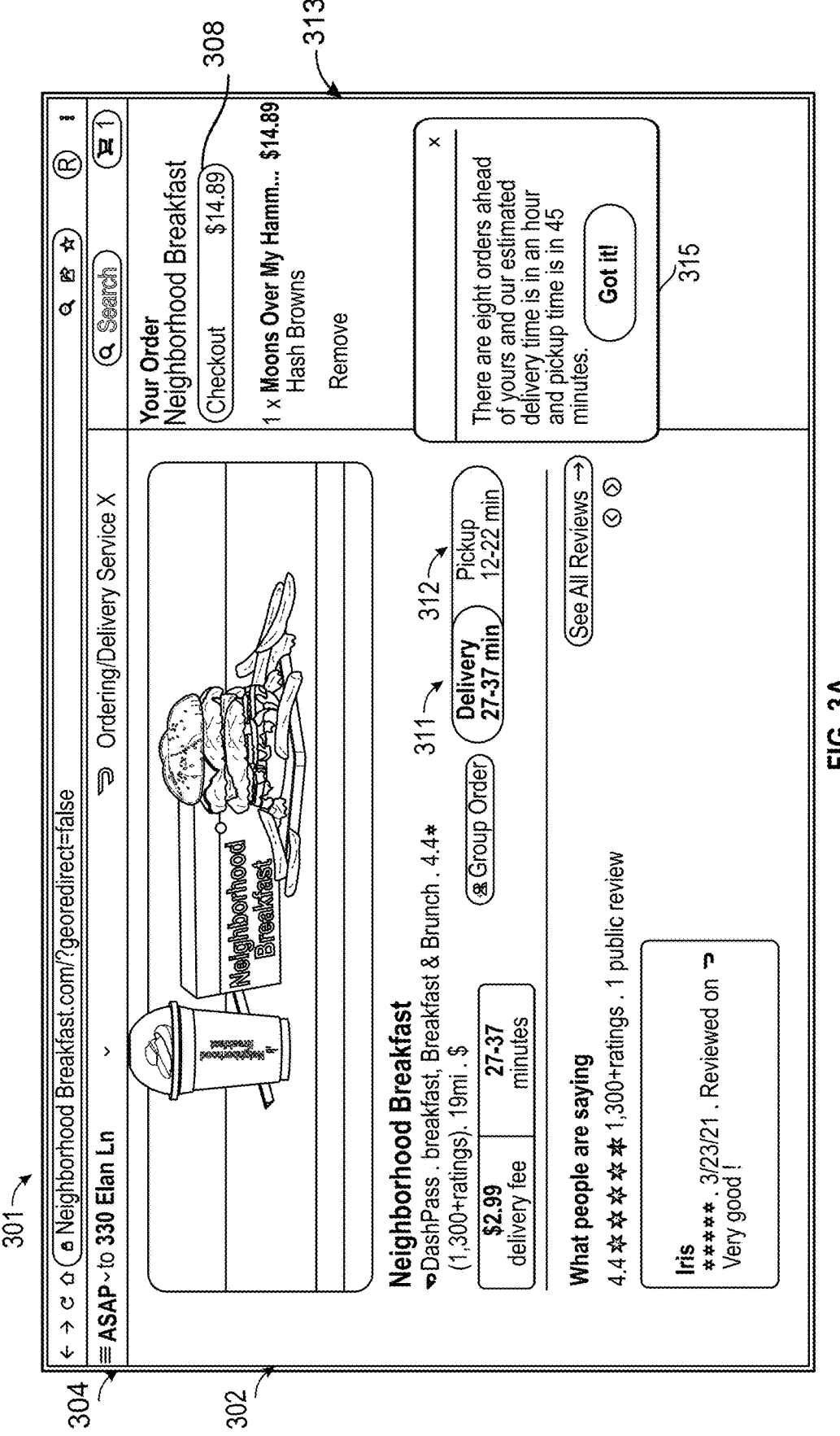
FIGS. 3A-3D are diagrams illustrating exemplary graphical user interfaces (GUIs) involving aspects and features associated with curation and integration of contextual information (e.g., transaction-related contextual information), consistent with exemplary aspects of certain embodiments of the present disclosure.

In some embodiments, and as shown in FIG. 3A, the application may be configured to operate an extension to a web browser application executing on a computing device of the user. For example, the browser extension may be configured to make an API request to the web browser application to receive and/or pass information related to generate an estimated completion time. In one example, the browser extension may be configured to receive information from the browser application such that the user's action and interaction with the merchant at the web browser can be monitored. In another example, once receiving the estimated completion time as described above, the browser extension may be configured to pass the estimation as a parameter to the browser application for processing, for example, as parameters to populate a float widow that is triggered into displaying once the extension has collected sufficient entity-specific user activity information (e.g., user device-executed user activity data) to generate such an estimation (e.g., user has selected items into a cart for checking out, entered a delivery address, indicated a pick up order, indicated a particular time frame for delivery or pick up, and so on).

Figures 3B, 3C, 3D:
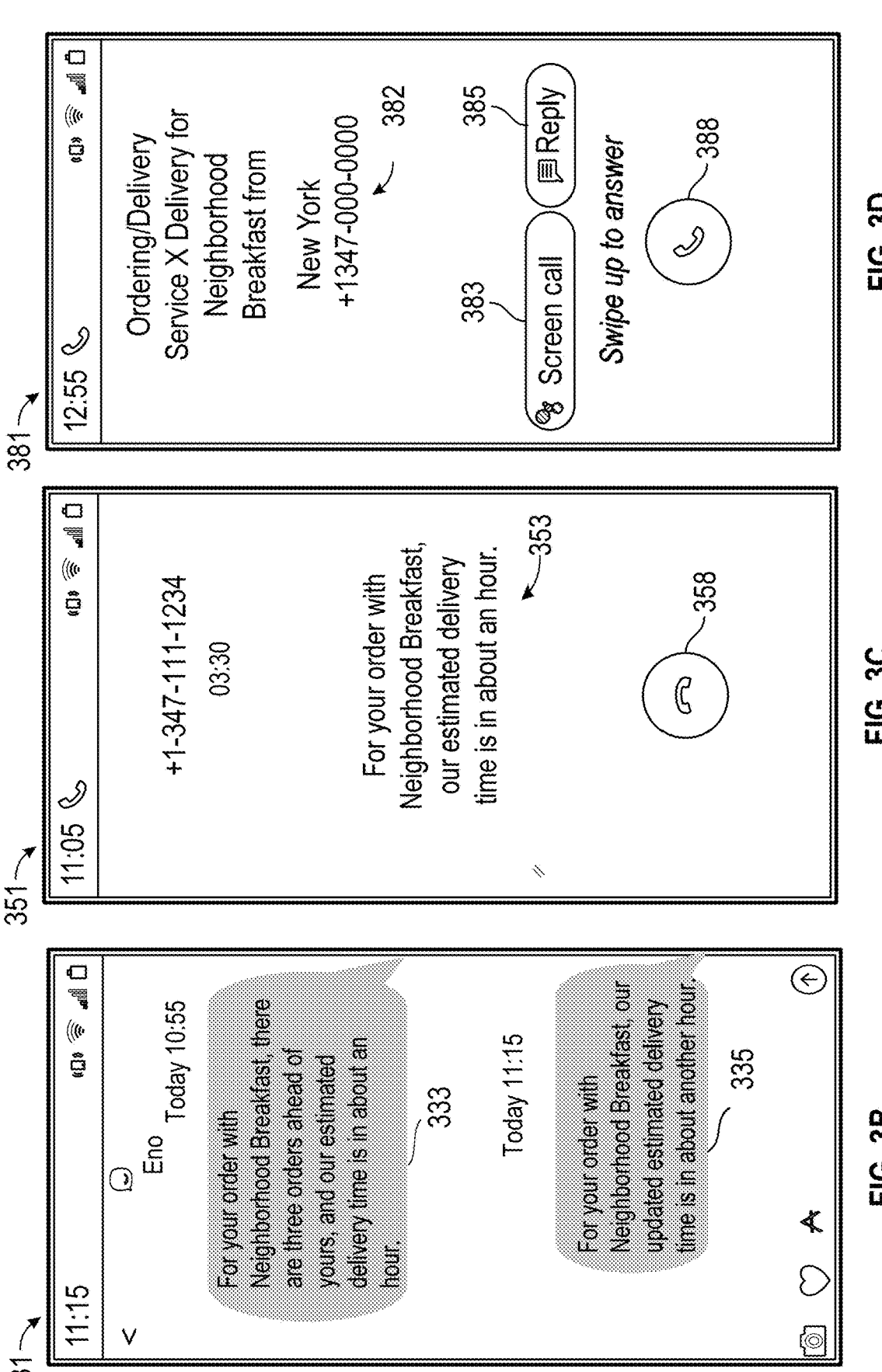

In some embodiments, and as shown in FIGS. 3B-3D, the application may be configured to display a prediction of the user-specific entity activity completion time. For instance, the application may be configured to make an API request (e.g., a push call) to the phone interface application (e.g., the native phone application configured to display conventional caller ID information on the display of the mobile device), or a messaging application executing on the mobile device) to pass the information related to the predicated completion time, for example, as a parameter to the phone interface application or the messaging application. As a result, upon receiving the information of such information, the phone interface application and the messaging application may be configured to display the information such as the estimated completion time on the display of the mobile device.

Any suitable techniques may be implemented to represent and notify to the user of the estimated user-specific entity activity completion time, not limited by the embodiments illustrated herein. By way of non-limiting examples, the user-specific entity activity completion time may be provided to the user using media such as an audio message, a graphical display (e.g., a banner, a float window overlaying the GUI of the native phone interface application, etc.), a push notification, a textual display at the GUI elements of a home screen of the computing devices, and so on.

FIG. 3A illustrates an exemplary GUI 301 of the illustrative application (e.g., a web browser application) for displaying user-specific entity activity completion time in association with the user's interaction with the merchant at a browser application executing at the mobile device. The GUI 301 may include an ordering/delivery service X (e.g., DoorDash) web page specifically presenting the services from a merchant Neighborhood Breakfast. Here, prior to navigating to the GUI 301, the user may have already registered or otherwise entered an address for delivery and selected a timing option for delivery as "ASAP" such that a section 304 of the GUI 301 is configured to display "ASAP to 330 Elan Ln." At the GUI 301, the user may have also already selected one or more items for purchase. As a result, a section 313 of the GUI 301 is configured to indicate that the user has selected one item priced at $14.89 such that a checkout button 308 is labeled "Checkout $14.89." In this example, among other information (e.g., the menu information, rating information, service description information, location information, and the like) displayed therein, a section 302 of the GUI 301 is configured with a section 311 to display to the user a delivery time (e.g., 27-37 min for this particular order), and at a section 312 to display to the user a pickup time (e.g., 12-22 min for this particular order).

Here, once detecting that the address information, delivery option information, as well as the information of the item of selection ready for checkout is available via monitoring the user's actions at the ordering/delivery service X (e.g., DoorDash) web page, the browser extension may cause the GUI 301 to display an estimation of the order completion time predicted by, for example, the server 101 of FIG. 1. In one example, the browser extension may be configured in communication with the server 101. As illustrated herein, a float window 315 is rendered and displayed to notify the user of an exemplary estimation represented as a message of "There are eight order ahead of yours and our estimated delivery time is in an hour and pickup time is in 45 minutes."

In some embodiments, and as shown in FIG. 3A, the displaying context can be determined prior to the GUI 301 being caused to display the estimation of the order completion time to the user. In this example, a timing aspect of the displaying context is determined as a point of time after the user has selected item(s) of activity (e.g., for transaction) into a shopping cart but has not yet committed the item(s) of activities (e.g., for transaction) via a checking out process at the GUI 301. Although not illustrated in FIG. 3A, the user might select multiple items over a duration of time into the shopping cart (e.g., browsing the menu, making group orders in corporation with friend(s)), and might also remove the selected item(s) from the shopping cart. In such scenarios, an exemplary timing aspect of the displaying context can be determined by monitoring the mouse position of the user (e.g., hovering over the scroll bar at the menu section) to determine a point of time that is approximate to the point of time when the user seems to have completed the addition and/or deletion of item(s) to the shopping cart. In one example, the point of time when the user might have finished interacting with the GUI 301 to finalize selection of item(s) of activities (e.g., for transaction) is detected based on there being no actions from the user at the GUI 301, or in a pre-configured lapse of time from detecting there have been no actions from the user at the GUI 301, and so on. In some embodiments, the displaying context can be determined using a plurality of times such that the user can be notified accordingly and timely with regard to the estimations associated with different selections in the shopping cart. For example, the float window 315 may be configured to display an updated message regarding the estimated order completion time when there are any change to the items in the shopping cart, and/or after the user has performed an activity (e.g., a transaction to place the order).

In some embodiments not illustrated herein, the timing aspect of the displaying context can be determined prior to the user selecting any item into the shopping cart. In one example, upon detecting the user is browsing to view, for example, the delivery time and/or pickup time displayed at the GUI 301, the float window 315 may be triggered into displaying to notify the user of a generalized estimation for any potential order to be placed. For example, the window can be configured to display a message of "There are eight orders pending with the merchant right now and our estimate for a new order to complete takes about one hour for delivery and 40 minutes for pickup." In this example, once the user has selected item(s) to the shopping cart, the float window 315 can be configured to display an updated message adjusted by the content of the user's order (e.g., large order, one item order).

In addition to the timing aspect, a GUI positional aspect of the displaying context can be determined as well. In this example, the float window 315 is configured to be displayed in the vicinity to the section 311 and section 312, where the GUI 301 displays estimation information provided at the web site independent from the functionality of browser extension. In other embodiments, the float window 315 may be configured to be displayed in a location in the vicinity to the checkout button 308, be triggered into display upon the user clicking on the checkout button 308, and the like. Various embodiments herein may be configured such that the estimated order completion time is rendered or delivered in any suitable form or format (e.g., audio, video, animation), not limited by the examples herein.

In this example, the web browser application has been determined as the application utilized to notify the user. In other implementation, such an application may be determined as various other applications executing on the mobile device of the user. By way of non-limiting examples, the user-notifying application can be configured as an SMS application, a social service chat application, and the like, such that the estimated order completion time may be communicated to the user accordingly.

FIG. 3B illustrates an exemplary GUI 331 of an illustrative application (e.g., a chat application) for displaying user-specific entity activity completion time in association with the user's interaction with the merchant. Here, in this example, the user may have interacted with the merchant (e.g., Neighborhood Breakfast) to perform an activity (e.g., a transaction) for placing an order therewith. In some implementations, the user may have incurred such an activity (e.g., a transaction) via a web browser application or an application execution on the mobile device, or by placing a phone call to the merchant on the mobile device. In other implementations, the user may have incurred such an activity (e.g., a transaction) at another computing device other than the mobile device (e.g., at a browser application executing on a desktop computer), and the like.

In some embodiments, separately or in addition to the illustrative example of FIG. 3A, the triggering condition to cause the application (e.g., the chat application) into notifying the user with the curated contextual information may be based on the activity (e.g., transaction) incurred in association with the order placed with the merchant. For example, upon receiving the information of the incurred transaction, the server 101 may be triggered into applying the trained activity completion time estimation machine learning model to determine user-specific entity activity completion time prediction data. In this example, the timing aspect of the displaying context may be determined by the server 101 as within a pre-configured lapse of time (e.g., 5 seconds, 15 seconds) from the transaction. Here, the application for displaying is determined as the messaging applications, and as shown in this example, the application is configured to display a message 333 to notify to the user that "For your order with Neighborhood Breakfast, there are three orders ahead of yours, and our estimated delivery time is in about an hour."

In some embodiments, after displaying the message 333 upon the user activity (e.g., transaction) with the merchant, the GUI 331 may be configured to notify the user of updated estimation of the completion time for the order, if there is any. In this example, 20 minutes subsequent to sending the user the message 333, the GUI 331 of the application may be configured to notify the user with a message 335, which displays an updated estimate to the user as "For your order with Neighborhood Breakfast, our updated estimated delivery time is in about another hour."

In some embodiments (not shown here), the GUI 331 may be configured to notify the user of various information. In one example, the GUI 331 may be configured to notify the user that the delivery person has picked up the order, and provides another update with regard to the delivery segment (e.g., given the traffic, weather, number of delivery along the route, what is the new estimate for the delivery time), and so on.

FIG. 3C illustrates an exemplary GUI 351 of an illustrative application (e.g., a call application) for displaying user-specific entity activity completion time in association with the user's interaction with the merchant. Here, in this example, the user has called and is in the middle of talking to an agent of the merchant (e.g., by placing a call to 1-347-111-1234 of Neighborhood Breakfast) to place an order. In this exemplary phone call, with the user's permission, an application such as the illustrative application 194 may detect that the user has initiated an outgoing phone call to a party and start to monitor the content of the conversation conducted at the phone call. In some embodiments, the application 194 may be configured to utilize natural language process (NLP) techniques to determine one or more factors contributing to a triggering condition that causes the application (e.g., the call application) into notifying the user with the curated contextual information. By way of non-limiting examples, such one or more factors may include that the call receiving party is a merchant, the user has placed orders with the merchant to incur an activity (e.g., a transaction (e.g., the user has provided the merchant with the selection of items, and payment information such as a credit card number information, whether the user places a delivery order or pick up order)), and so on.

In this example, the timing aspect of the displaying context can be determined as a point of time prior to the user concluding the phone call. In one example, the timing aspect may be determined as a point of time within a pre-configured lapse of time (e.g., 2 seconds, 5 seconds) from the point of time where the application 194 has monitored to determine that the user has finalized the selection of items, the agent of the merchant has started to inquire about the payment information, and the like. Here, the displaying application is determined as the call application (e.g., the call screen GUI 351), and as shown in this example, the application is configured to display a message 353 at the GUI 351 to notify to the user that "For your order with Neighborhood Breakfast, our estimated delivery time is in about an hour" on its call screen. Thus, prior to clicking on a button 358 to conclude the call to the merchant, the user can be provided with an estimation of the completion time for the order placed at the phone call.

For purposes of illustration, data structures and/or operations specific to phone calls are used herein as non-limiting examples to describe some embodiments of the present disclosure. Various aspects of various disclosed technological improvements may apply to communications at various modalities to notify the user of the estimation of the completion time of the order. By way of non-limiting examples, such communications may be in the forms of an SMS, an MMS, an email, a chatting message, a social media message, a push message of an application, and the like, not limited by the embodiments illustrated herein.

In some embodiments, and as illustrated above with reference to FIG. 3B, the notification can be transmitted to the user subsequent to the user clicking on the button 358 to conclude placing the order with the merchant. In this scenario, the notification of the estimated completion time may be delivered as a chat message, an SMS message, and so on.

FIG. 3D illustrates an exemplary GUI 381 for utilizing user-specific entity activity completion time to determine and notify to the user that a call incoming at the mobile device is associated with the delivery portion of the avidity. The GUI 381 may include a caller ID 382 and a set of buttons 303, 305, and 308 for the user to select. Here, the caller ID 382 may be configured to display to the user that the call is from a caller associated with a calling phone number, i.e., "1-347-000-0000," and "New York" as the area associated with the phone number's area code. In this example, similar to the examples of FIG. 3B-3C, the user may have interacted with the merchant (e.g., Neighborhood Breakfast) to perform an activity (e.g., a transaction for placing an order therewith) in various manners. For example, the user may have performed such an activity (e.g., a transaction) upon the user clicking on the checkout button 308 at the GUI 301, upon the user calling the merchant at the GUI 351, and the like.

Here, differently from the examples illustrated in FIGS. 3A-3C, the predicted estimation of the completion time for the order is not displayed to the user, but instead utilized to determine whether an incoming call is associated with the delivery portion of the activity that has been incurred by the user with the merchant. In some embodiments, based on the one or more estimations of the completion time provided for the order, a call incoming at the mobile device that is within or around the latest estimated completion time may be determined as being associated with the delivery portion. In one embodiment, the illustrative application 194 may be provided with the additional information of the call that pertains to the particular order or delivery. As a result, at the GUI 381, the caller ID information may be augmented with the determined additional activity or order information associated with the incoming call. For example, using the augmented information notified to the application 194, the caller ID information may be determined and displayed as "Ordering/Delivery Service X Delivery" even though the particular phone number "1-347-000-0000" is unknown to the user.

In some embodiments, and as shown here in FIG. 3D, the caller identification information determined may include further information with regard to the specific call. By way of non-limiting examples, the caller identification information may include information related to the merchant with which the activity is incurred. In one example, the information related to the merchant may include the type of the merchant (e.g., food delivery, grocery delivery, Amazon delivery, department store delivery, etc.). Here, as shown in FIG. 3D, in addition to determining the incoming call as associated with an ordering/delivery Service X delivery, the caller information may be determined to include the merchant information of "Neighborhood Breakfast." As such, here in FIG. 3D, the GUI 381 may be configured to display the caller ID 382 as "Ordering/Delivery Service X Delivery for Neighborhood Breakfast from 1-347-000-0000 New York."

In some embodiments, and not shown here in FIG. 3D, the caller information may be determined to include information related to the transaction, and/or information related to the delivery portion of the transaction. Continuing from the example above, the caller ID 382 may further display information such as the detailed activity (e.g., order information (e.g., the order time, items of the order, the amount of the order, a type of the transaction as a credit card transaction, a debit card transaction, an online transaction, an point of sale (POS) transaction, etc.)) for which the activity (e.g., the transaction) is performed, and/or the delivery condition(s) (e.g., routes taken for the delivery, weather information, traffic information, etc.). Any suitable content that can be determined in association with the transaction, the merchant, the delivery service may be provided as part of the caller identification information to the application 194, not limited by example illustrated herein.

In some embodiments, and not shown in FIG. 3D, the caller identification information determined may similarly include further information with regard to the specific call. By way of non-limiting examples, the caller identification information may include information related to the activity (e.g., the transaction pending), information related to the merchant with which the activity (e.g., transaction) is pending, information of the delivery portion of the order. Any suitable content that can be determined in association with the pending transaction, the merchant, the delivery portion may be provided as part of the call-specific caller identification information to the application 194, not limited by example illustrated herein.

Here, at GUI 381, the user can interact with the selectable options to perform actions with regard to the pending incoming call. In this example, the user can select the button 383 to screen the incoming call, select the button 385 to reply with a message, or select the button 388 to swipe up to answer the incoming call. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofing phone numbers, and the like.

Further, the user may perform other actions upon the incoming call in addition to or in place of those illustrated in FIG. 3D. For example, the user can interact with the GUI 381 to decline the incoming call while it is still pending, report the phone number included in the caller ID 382 to a server (e.g., the server 101 of FIG. 1) or log locally as associated with a delivery service associated with an activity (e.g., a transaction) with a merchant without screening the call or after screening the call, report the call time or log locally as associated with a delivery associated with an activity (e.g., a transaction) with a merchant, report the phone number or log locally as associated with a delivery associated with an activity (e.g., a transaction) with a merchant after selecting the button 388 to answer the call, report the phone number or log locally as not associated with a delivery associated with an activity (e.g., a transaction) with a merchant after selecting the button 388 to answer the call, and the like.

FIG. 4 is a flow diagram illustrating an exemplary process 400 related to curation and integration of contextual information via machine learning techniques, consistent with exemplary aspects of at least some embodiments of the present disclosure. Referring to FIG. 4, the illustrative curation and integration of contextual information process 400 may comprise: obtaining a trained activity completion time estimation machine learning model that determines activity completion time prediction data for an activity of an entity, at 402; receiving, from a first computing device of a user, current entity-specific device-executed user activity data of a current entity-specific user activity associated with a particular user and a particular entity, at 404; receiving, from a second computing device associated with the particular entity, current user-specific entity activity data associated with a current user-specific entity activity, related to the current entity-specific user activity, at 406; utilizing the trained activity completion time prediction machine learning model to determine current user-specific entity activity completion time prediction data for the current user-specific entity activity, at 408; determining a current displaying context associated with one or more current actions performed by the user with the first computing device so as to notify to the user of the current user-specific entity activity completion time prediction, at 410; and instructing, the first computing device of the user to generate a graphical user interface (GUI), where the GUI comprises at least one GUI element that is configured to display the displaying context to the user so as to notify the user regarding the current user-specific entity activity completion time prediction data for the current user-specific entity activity, at 412. In other embodiments, the curation and integration of contextual information process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the curation and integration of contextual information process 400 may include, at 402, a step of obtaining a trained activity completion time estimation machine learning model that determines activity completion time prediction data for an activity of an entity. In some embodiments, the trained activity completion time estimation machine learning model may be trained to predict activity completion time based on at least one pattern between entity-specific user activity data of at least one user and entity activity data of the entity. In one example, the entity-specific user activity data may be indicative of past device-executed interactions by the at least one user with the entity, and the activity completion time prediction data may be indicative of when the entity activity is to be completed by the entity.

With regard to the disclosed innovation, the activity completion time estimation machine learning model may be trained based at least in part on one or more of: (i) information of a first plurality of entities, entity activity data associated with a first plurality of activities associated with the first plurality of entities, entity-specific user activity data of a first plurality of users associated with the first plurality of activities, phone number information of a first plurality of phone numbers associated with a first plurality of service providers, the first plurality of service providers associated with delivery portions of the first plurality of activities; timing information of when the first plurality of service providers complete the delivery portions of the first plurality of activities, timing information associated with the first plurality of activities, and at least one of: a) profile information of the first plurality of service providers; b) contextual information associated with the first plurality of activities; c) profile information of the first plurality of entities; or d) contextual information associated with the entities.

In some embodiments, the plurality of training information of the first plurality of entities may include various information about each entity. In some embodiments, the first plurality of entities may include a plurality of merchants or service providers. By way of non-limiting examples, such training information may include business description information of an entity, business type of the entity, web page information of the entity, phone number information about the entity, location information about the entity, customer review/rating information about the entity, third-party vendor or service provider information about the entity, and the like.

In some embodiments, the training entity-specific user activity data of the first plurality of users associated with the first plurality of activities may include various types of user activities and/or various data associated with the user activities. In one example and as illustrated in the embodiments described above, the entity-specific user activity data may include the information related to the orders placed by the first plurality of users with the first plurality of entities. By way of non-limiting examples, such entity-specific user activity data may include information related to the description of the items ordered (e.g., goods or services ordered), the number of items ordered, the timing information associated with the order, the delivery location associated with the orders, and the like. In some embodiments, the entity-specific user activity data may be associated with a plurality of respective transactions, either online or in-store, in association with purchasing of the above described goods, services, or some combination thereof.

In some embodiments, the training entity activity data associated with the first plurality of activities associated with the first plurality of entities may include various types of activities and/or various data associated with the activities. In one example and as illustrated in the embodiments described above, the entity activity data may include the information related to the merchant in completion of the orders received from the first plurality of users. By way of non-limiting examples, such entity activity data may include information related to how many incomplete orders at the time each order is received, how many delivery people to service the delivery portion of each order, and the like.

In some embodiments, the training phone numbers associated with the first plurality of service providers may be obtained or otherwise identified via various resources and/or services. In some examples, the phone numbers associated with calls from the first plurality of service providers may be reported by the call receiving users, identified by an incoming call detection application (e.g., the application 194) and reported to a server (e.g., the server 101 of FIG. 1), and/or identified by the first plurality of entities, and the like. In one embodiment, the call receiving users may utilize, for example, the GUI features illustrated with reference to FIG. 3D to report the phone numbers as from the first plurality of service providers completing the delivery portions of respective transactions of the users. In one embodiment, the service provider and the entity may be the same entity.

In some embodiments, the training timing information associated with the first plurality of activities may include a plurality of timing information when each activity occurs. In one example, the timing information associated with the first plurality of activities may include a plurality of timestamps for the respective activity associated with each activity. In some embodiments, the timing information of when the first plurality of service providers complete the delivery portions of the first plurality of activities may include a delivery time for each activity of the first plurality of activities.

The service provider profile information may include information relating to one or more of: demographic information, account information, rating information, operating time information, historical service information, any data provided by the service providers, any data provided on behalf of the service providers, and the like. The contextual aspect of the service provider profile information and service provider contextual information may comprise information relating to one or more of: a timing, a location of the service provider, an action of the service provider, calendar information of the service provider, contact information of the service provider, habits of the service provider, preferences of the service provider, communication history, past service history, traffic information associated with the services performed by the service provider, weather information associated with such services, events and/or holiday information associated with such services, routes taken in association with such services, types of transportation taken in association with such services, description of the content associated with such services, profile and/or contextual information of individual(s) and entity(ies) the service provider is associated with, and the like. In some embodiments, the service provider profile information and/or service provider contextual information may be provided by the service provider, detected by a server (e.g., the server 101 of FIG. 1), and/or a component external thereto, or in some combination thereof.

The contextual information associated with the first plurality of activities may include information relating to one or more of: the timing of an activity (e.g., order), the size of the order, the detailed items included in the order, the delivery address associated with the order, the scheduled timing associated with the order, and the like. In some embodiments, such information may further include any suitable conditions that may impact the duration of time for an order to be completed (e.g., either being picked up or delivered). For example, such information may include, in association with each activity (e.g., order) the traffic information, weather information, holiday information, game night information, and the like.

The entity profile information may include information relating to one or more of: type of business, headquarter location, branch location, employee information, management information, revenue information, press release information, product release information, stock information, privacy information, any data provided by the entity, and the like. The contextual information of an entity may comprise information related to one or more of: a timing, a location, how many instances of activities are being engaged (e.g., how many pending orders, etc.), how many instances of activities are completed (e.g., how many orders are completed, etc.), how many service providers are associated therewith, and the like.

Trained with the above-described training data, the activity completion time estimation machine learning model may be utilized to receive an input of entity-specific user activity data associated with an activity of a user (engaged with an entity) and/or information of user-specific entity activity data such that to predict current user-specific entity activity completion time for a current user-specific entity activity. In some embodiments, the activity completion time estimation machine learning model may predict an estimated time to complete, which, for example, can be utilized to determine whether an incoming call from a unknown phone number is associated with the delivery portion of a transaction.

Taking an order of a meal from a restaurant for example, the activity completion time estimation machine learning model may be trained to predict, for the particular restaurant and a particular user's delivery address, an amount of time starting from the activity time (e.g., order time) to the delivery call time (or pickup time, pickup call time). In some implementations, such a prediction may be learned and made based on one or more items of other information such as the information of the order itself (e.g., the size of an order, the particular items of the order, the particular timing of the order (e.g., relative to the day, the week, the month, a holiday, etc.)), the particular delivery time, the particular weather condition, the particular traffic condition, the particular number of deliveries engaged by a service provider servicing the delivery, how busy the restaurant is relative to one or both of the order time and the requested delivery time, and so on.

In some embodiments, the activity completion time estimation machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training data, and/or trained models from a third-party data source, third-party machine learning model generators, and the like.

It should be further understood that, in some embodiments, the activity completion time estimation machine learning model may be trained via a server in conjunction with a computing device of the user and/or merchant. Here, for example, the server may be configured to initially train a baseline call verification model based on the above-described training data of the first plurality of users (not including the user) and/or a plurality of such training data from the plurality of third-party data sources. Subsequently, the baseline activity completion time estimation model may be transmitted to the computing device associated with the user to be trained with the particular training data associated with the user. In one example, the activity completion time estimation model may be trained as an entity-specific model, a group of entity-specific model, a geo location-specific model, a time-specific model, and the like. A group of entities may be based on various characteristics such as the types of activities (e.g., services of restaurants, coffee shops, auto repair shops, department stores, online retailers, etc.), the locations of the entities (e.g., downtown area, a particular neighborhood, etc.), and the like.

In some embodiments, the phone number information of the first plurality of phone numbers or the timing information of when the first plurality of service providers complete the delivery portions of the first plurality of activities may be obtained via: receiving, from each of a first plurality of computing devices of a first plurality of users, a permission indicator identifying a permission by each of the first plurality of users to detect communications being received by the first plurality of computing devices; and/or receiving, by from the first plurality of computing devices, indications of communications being received from first plurality of service providers in association with completion of the delivery portions of the first plurality of activities, wherein the communications are associated with first plurality of phone numbers. As a result, the server 101 (e.g., in communication with the application 194) may be uniquely positioned to collect the training data that include ending time associated with the conclusion of each activity (e.g., transaction) upon detecting delivery calls/pickup calls in improved precision. Further, the server 101 (e.g., associated with an exemplary FSP system) may also be uniquely positioned to collect the training data that include starting time associated with each activity (e.g., transaction) in improved precision. Thus, the activity completion time estimation machine learning model may be trained with improved, high fidelity training historical time to complete, separately and/or in addition to various other training data described above to provide improved, more accurate predictions for the time to complete.

The curation and integration of contextual information process 400 may include, at 404, a step of receiving, from a first computing device of a user, current entity-specific device-executed user activity data of a current entity-specific user activity associated with a particular user and a particular entity. In some embodiments, the current entity-specific user activity may be associated with a current entity activity to be completed at a future point of time by a particular service provider associated with the particular entity, and/or the current entity-specific device-executed user activity data may be indicative of one or more current actions of the user with the first computing device. In some implementation, the current user-specific entity activity data may include at least one of: time information related to the current user-specific entity activity, location information related to the current user-specific entity activity, traffic information related to the current user-specific entity activity, weather information related to the current user-specific entity activity, holiday information related to the current user-specific entity activity, event information related to the current user-specific entity activity, or calendar information of the user.

The curation and integration of contextual information process 400 may include, at 406, a step of receiving, from a second computing device associated with the particular entity, current user-specific entity activity data associated with a current user-specific entity activity, related to the current entity-specific user activity. In some embodiments, the current user-specific entity activity data may be associated with data of the particular entity, data of the particular service, or both. In one example, the current user-specific entity activity data may include at least one of: a number of activities pending with the particular entity, or a number of service providers servicing delivery portions of the activities pending with the particular entity. In one example, the current user-specific entity activity data comprises at least a number of deliveries pending with the particular service provider.

The curation and integration of contextual information process 400 may include, at 408, a step of utilizing the trained activity completion time prediction machine learning model to determine current user-specific entity activity completion time prediction data for the current user-specific entity activity. In some embodiments, the trained activity completion time prediction machine learning model to determine current user-specific entity activity completion time prediction data based at least in part on the current entity-specific device-executed user activity data, and/or the current user-specific entity activity data. In some implementations, the details regarding the utilizing of the trained activity completion time prediction machine learning model are similar to those described with reference to FIGS. 1, 2A-2B, and 3A-3D, and are not repeated herein.

The curation and integration of contextual information process 400 may include, at 410, a step of determining a current displaying context associated with one or more current actions performed by the user with the first computing device so as to notify to the user of the current user-specific entity activity completion time prediction. In some embodiments, the displaying context may be determined by monitoring the one or more current actions/interactions performed by the user with the first computing device. In one example, the monitoring may be performed by a browser extension of a web browser executing on the first computing device. In another example, the monitoring may be performed by monitoring the content of a phone call involving the first computing device. In some implementations, the displaying context may include one or more of a timing aspect, a displaying application context, or a displaying positional context. Details are similar to those described above with reference to FIGS. 3A-3D and not repeated herein.

The curation and integration of contextual information process 400 may include, at 412, a step of instructing, the first computing device of the user to generate a graphical user interface (GUI), where the GUI comprises at least one GUI element that is configured to display the displaying context to the user so as to notify the user regarding the current user-specific entity activity completion time prediction data for the current user-specific entity activity.

In some embodiments, the GUI may be associated with a user interface at which the user is performing one or more actions with the merchant. For example, the GUI may include the float window 315 in association with the web browser user interface of FIG. 3A. For another example, the GUI may include the call screen GUI 351 in association with the call application user interface of FIG. 3C. In some embodiments, the GUI may be associated with the at least one communication, wherein the GUI comprises at least one GUI element. For example, the GUI may include the chat screen GUI 331 in association with the chat application user interface of FIG. 3B. In other embodiments, the GUI may be displayed in a standalone manner, without association with the at least one communication. In various embodiments, the above-described notifications may be rendered and/or displayed in any suitable form or format, such as and not limited to, an audio message, a tone, a push notification, an animated notification, a textual display at the GUI elements of a home screen of the computing devices, and so on.

Various embodiments herein may be configured such that information in addition to the notification is displayed to the user. By way of non-limiting examples, such information notified to the first user may include: activity information of the particular user activity, particular entity activity, or entity information of particular entity. Similar to what is described with reference to FIGS. 3A-3D, the additional information may include the information of an activity (e.g., a transaction (e.g., transacted amount, items of an order associated with the transaction, transaction type as online, at a POS, credit card based, debit card based, virtual card based, etc.)) and the information of the merchant with whom the first user's activity is performed with (e.g., a physical store, an online department store, DoorDash, Uber, etc.).

In some embodiments, the current entity-specific device-executed user activity data may be received prior to the current entity-specific user activity is confirmed with the particular entity. In some embodiments, the current entity-specific device-executed user activity data may be received after the current entity-specific user activity is confirmed with the particular entity.

In some embodiments, the curation and integration of contextual information process 400 may further include a step of determining one or more representations for the current user-specific entity activity completion time prediction. In one example, the one or more representations may include at least one of: a time duration corresponding to the current user-specific entity activity completion time prediction, a point of time corresponding to the current user-specific entity activity completion time prediction, or a description of one or more entity activities associated with the particular entity that are not completed and impact the current user-specific entity activity completion time prediction.

Figure 5:
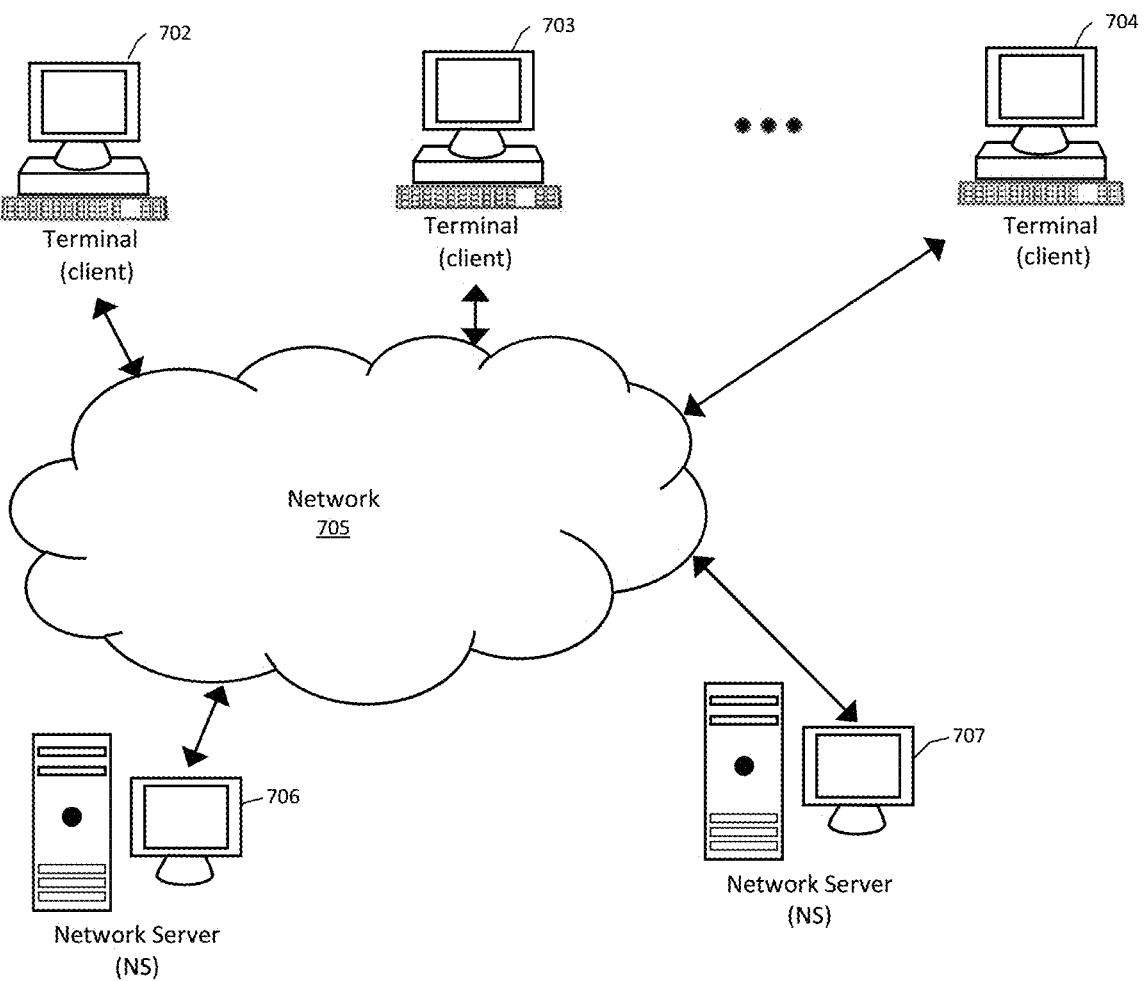
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/ or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
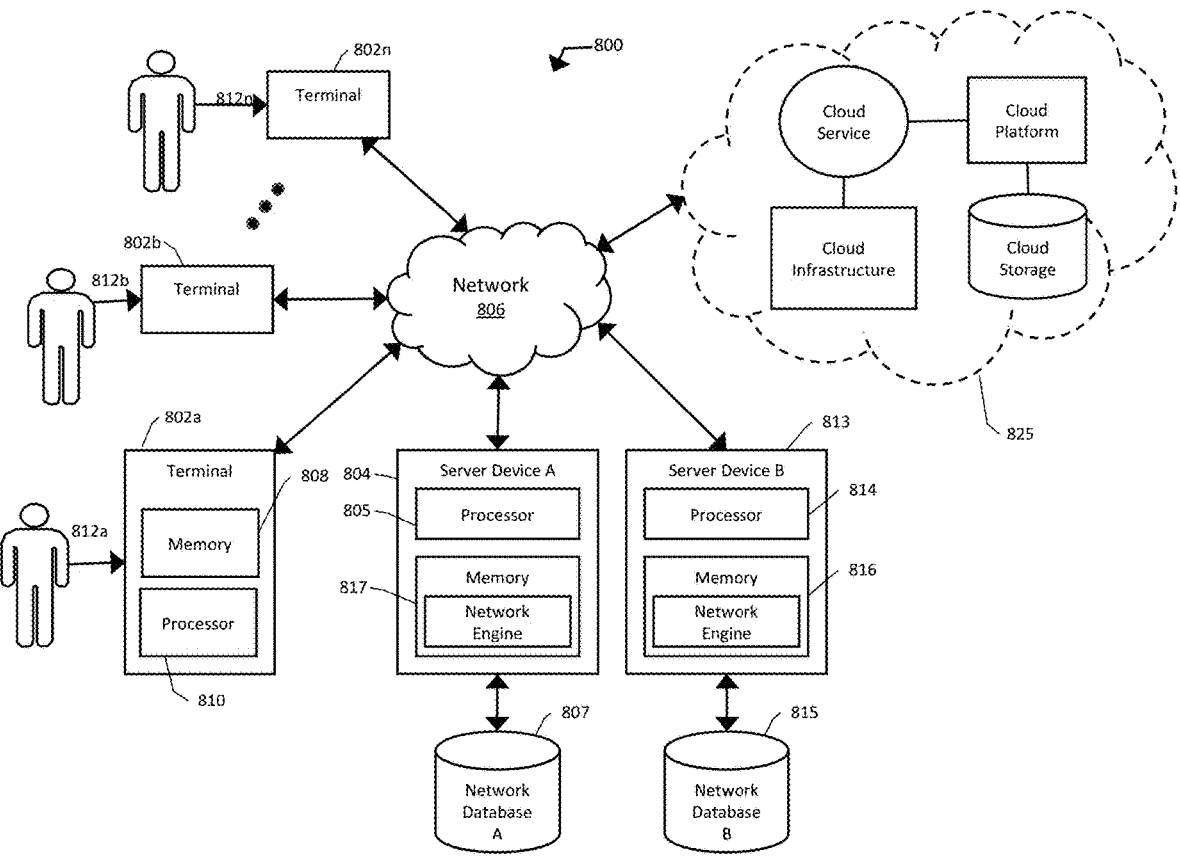
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
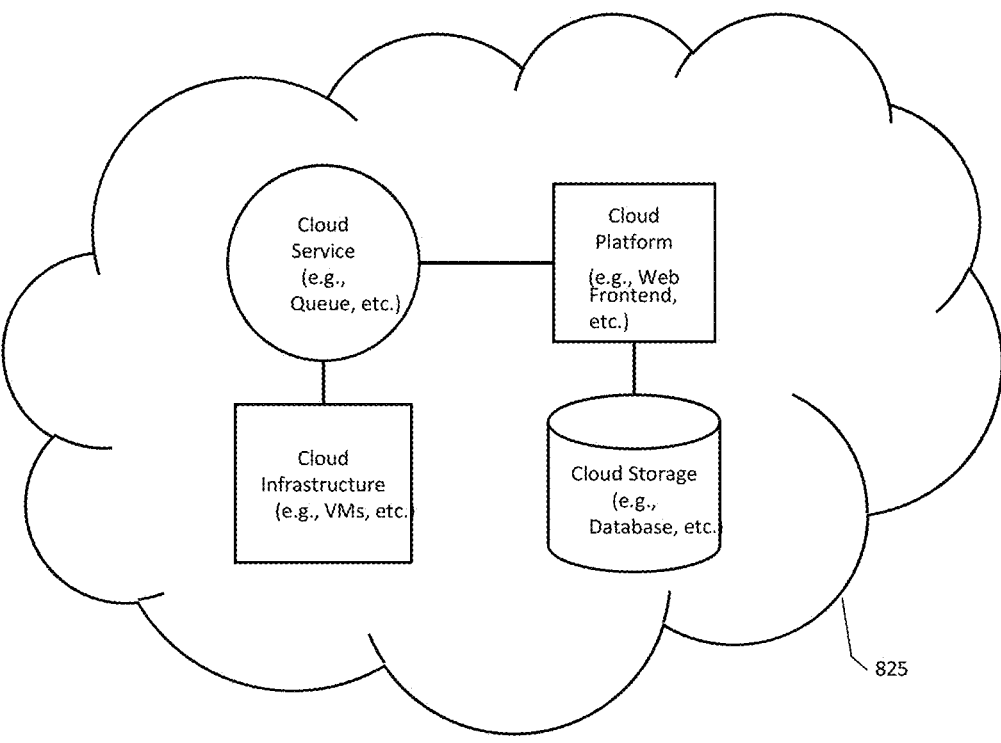
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
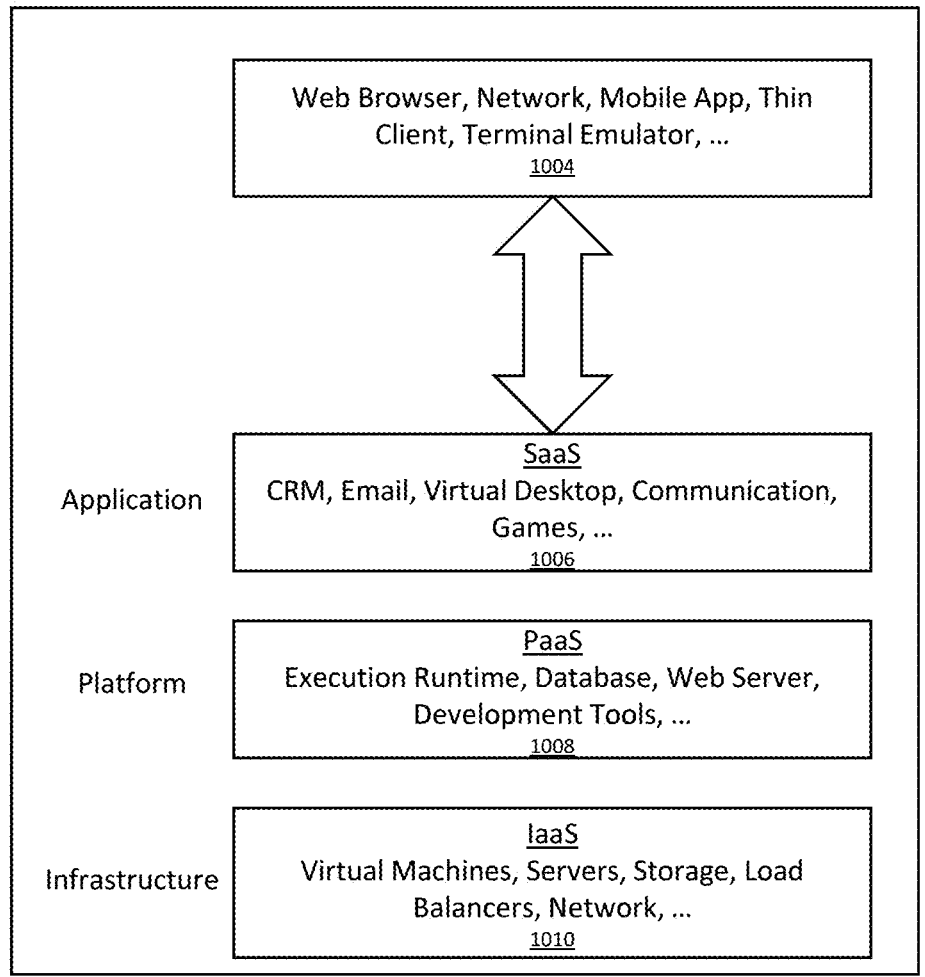

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:

obtaining, by one or more processors, a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receiving, by the one or more processors, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receiving, by the one or more processors, from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilizing, by the one or more processors, the trained activity completion time prediction machine learning model to determine current user-specific entity activity completion time prediction data for the current user-specific entity activity based at least in part on:

i) the current entity-specific device-executed user activity data, and ii) the current user-specific entity activity data;

determining, by the one or more processors, a current displaying context associated with one or more current actions performed by the user with the first computing device so as to notify to the user of the current user-specific entity activity completion time prediction; and instructing, by the one or more processors, the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

Clause 2. The method of clause 1 or any clause herein, where the trained activity completion time estimation machine learning model has been trained based on:

information of a first plurality of entities, entity activity data associated with a first plurality of activities associated with the first plurality of entities, entity-specific user activity data of a first plurality of users associated with the first plurality of activities, phone number information of a first plurality of phone numbers associated with a first plurality of service providers, the first plurality of service providers associated with delivery portions of the first plurality of activities;

timing information of when the first plurality of service providers complete the delivery portions of the first plurality of activities, timing information associated with the first plurality of activities, and at least one of:

a) profile information of the first plurality of service providers;

b) contextual information associated with the first plurality of activities;

c) profile information of the first plurality of entities; or d) contextual information associated with the entities.

Clause 3. The method of clause 1 or any clause herein, where the determining of a current displaying context comprises: monitoring, by the one or more processors, the one or more current actions performed by the user with the first computing device.

Clause 4. The method of clause 3 or any clause herein, where the current entity-specific device-executed user activity data is received prior to the current entity-specific user activity is confirmed with the particular entity.

Clause 5. The method of clause 1 or any clause herein, where the current entity-specific device-executed user activity data is received after the current entity-specific user activity is confirmed with the particular entity.

Clause 6. The method of clause 1 or any clause herein, where the particular service provider and the particular entity are the same.

Clause 7. The method of clause 1 or any clause herein, where the current user-specific entity activity data comprises at least one of: time information related to the current user-specific entity activity, location information related to the current user-specific entity activity, traffic information related to the current user-specific entity activity, weather information related to the current user-specific entity activity, holiday information related to the current user-specific entity activity, event information related to the current user-specific entity activity, or calendar information of the user.

Clause 8. The method of clause 1 or any clause herein, where the current user-specific entity activity data comprises at least one of: a number of activities pending with the particular entity, or a number of service providers servicing delivery portions of the activities pending with the particular entity.

Clause 9. The method of clause 1 or any clause herein, where current user-specific entity activity data comprises at least a number of deliveries pending with the particular service provider.

Clause 10. The method of clause 1 or any clause herein, further comprising determining one or more representations for the current user-specific entity activity completion time prediction, the one or more representations including at least one of: a time duration corresponding to the current user-specific entity activity completion time prediction, a point of time corresponding to the current user-specific entity activity completion time prediction, or a description of one or more entity activities associated with the particular entity that are not completed and impact the current user-specific entity activity completion time prediction.

Clause 11. The method of clause 2 or any clause herein, where the phone number information of the first plurality of phone numbers associated with the first plurality of service providers or the timing information of when the first plurality of service providers complete the delivery portions of the first plurality of activities is obtained via:

receiving, by the one or more processors, from each of a first plurality of computing devices of a first plurality of users, a permission indicator identifying a permission by each of the first plurality of users to detect communications being received by the first plurality of computing devices; and receiving, by the one or more processors, from the first plurality of computing devices, indications of communications being received from first plurality of service providers in association with completion of the delivery portions of the first plurality of activities, wherein the communications are associated with first plurality of phone numbers.

Clause 12. The method of clause 3 or any clause herein, where the monitoring is performed by a browser extension of a web browser executing on the first computing device.

Clause 13. A system including:

a non-transient computer memory, storing software instructions;

at least one processor of a computing device;

where, when the at least one processor executes the software instructions, the computing device is programmed to:

obtain a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receive, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receive from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilize the trained activity completion time prediction machine learning model to determine current user-specific entity activity completion time prediction data for the current user-specific entity activity based at least in part on:

i) the current entity-specific device-executed user activity data, and ii) the current user-specific entity activity data;

determine a current displaying context associated with one or more current actions performed by the user with the first computing device so as to notify to the user of the current user-specific entity activity completion time prediction; and instruct the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

Clause 14. The system of clause 13 or any clause herein, where the trained activity completion time estimation machine learning model has been trained based on:

information of a first plurality of entities, entity activity data associated with a first plurality of activities associated with the first plurality of entities, entity-specific user activity data of a first plurality of users associated with the first plurality of activities, phone number information of a first plurality of phone numbers associated with a first plurality of service providers, the first plurality of service providers associated with delivery portions of the first plurality of activities;

timing information of when the first plurality of service providers complete the delivery portions of the first plurality of activities, timing information associated with the first plurality of activities, and at least one of:

a) profile information of the first plurality of service providers;

b) contextual information associated with the first plurality of activities;

c) profile information of the first plurality of entities; or d) contextual information associated with the entities.

Clause 15. The system of clause 13 or any clause herein, where to determine a current displaying context comprises to monitor the one or more current actions performed by the user with the first computing device.

Clause 16. The system of clause 13 or any clause herein, where the current entity-specific device-executed user activity data is received prior to the current entity-specific user activity is confirmed with the particular entity.

Clause 17. The system of clause 13 or any clause herein, where current entity-specific device-executed user activity data is received after the current entity-specific user activity is confirmed with the particular entity.

Clause 18. The system of clause 13 or any clause herein, where the current user-specific entity activity data comprises at least one of: time information related to the current user-specific entity activity, location information related to the current user-specific entity activity, traffic information related to the current user-specific entity activity, weather information related to the current user-specific entity activity, holiday information related to the current user-specific entity activity, event information related to the current user-specific entity activity, or calendar information of the user.

Clause 19. The system of clause 13 or any clause herein, where computing device is programmed to determine one or more representations for the current user-specific entity activity completion time prediction, the one or more representations including at least one of: a time duration corresponding to the current user-specific entity activity completion time prediction, a point of time corresponding to the current user-specific entity activity completion time prediction, or a description of one or more entity activities associated with the particular entity that are not completed and impact the current user-specific entity activity completion time prediction.

Clause 20. A computing device including:

a non-transient computer memory, storing software instructions;

at least one processor;

where, when the at least one processor executes the software instructions, the computing device is programmed to:

obtain a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receive, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receive from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilize the trained activity completion time prediction machine learning model to determine current user-specific entity activity completion time prediction data for the current user-specific entity activity based at least in part on:

i) the current entity-specific device-executed user activity data, and ii) the current user-specific entity activity data;

determine a current displaying context associated with one or more current actions performed by the user with the first computing device so as to notify to the user of the current user-specific entity activity completion time prediction; and instruct the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

obtaining, by one or more processors, a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receiving, by the one or more processors, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receiving, by the one or more processors, from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilizing, by the one or more processors, the trained activity completion time prediction machine learning model to determine current user-specific entity activity completion time prediction data for the current user-specific entity activity based at least in part on:

i) the current entity-specific device-executed user activity data, ii) the current user-specific entity activity data, or iii) a combination of both the current entity-specific device-executed activity data and the current user-specific entity activity data, wherein the trained activity completion time prediction machine learning model is configured to capture one or more real-time events via a browser extension associated with the first computing device;

determining, by the one or more processors, a current displaying context associated with one or more current actions based on the one or more real-time events and performed by the user with the first computing device so as to notify to the user of the current user-specific entity activity completion time prediction; and instructing, by the one or more processors, the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

2. The method of claim 1, wherein the trained activity completion time estimation machine learning model has been trained based on:

i) information of a first plurality of entities, ii) entity activity data associated with a first plurality of activities associated with the first plurality of entities, iii) entity-specific user activity data of a first plurality of users associated with the first plurality of activities, iv) phone number information of a first plurality of phone numbers associated with a first plurality of service providers, the first plurality of service providers associated with delivery portions of the first plurality of activities;

v) timing information of when the first plurality of service providers complete the delivery portions of the first plurality of activities, vi) timing information associated with the first plurality of activities, and vi) at least one of:

a) profile information of the first plurality of service providers;

b) contextual information associated with the first plurality of activities;

c) profile information of the first plurality of entities; or d) contextual information associated with the entities.

3. The method of claim 1, wherein the determining of a current displaying context comprises:

monitoring, by the one or more processors, the one or more current actions performed by the user with the first computing device.

4. The method of claim 1, wherein the current entity-specific device-executed user activity data is received prior to when the current entity-specific user activity is confirmed with the particular entity.

5. The method of claim 1, wherein the current entity-specific device-executed user activity data is received after the current entity-specific user activity is confirmed with the particular entity.

6. The method of claim 1, wherein the particular service provider and the particular entity are the same.

7. The method of claim 1, wherein the current user-specific entity activity data comprises at least one of: time information related to the current user-specific entity activity, location information related to the current user-specific entity activity, traffic information related to the current user-specific entity activity, weather information related to the current user-specific entity activity, holiday information related to the current user-specific entity activity, event information related to the current user-specific entity activity, or calendar information of the user.

8. The method of claim 1, wherein the current user-specific entity activity data comprises at least one of: a number of activities pending with the particular entity, or a number of service providers servicing delivery portions of the activities pending with the particular entity.

9. The method of claim 1, wherein the current user-specific entity activity data comprises at least a number of deliveries pending with the particular service provider.

10. The method of claim 1, further comprising determining one or more representations for the current user-specific entity activity completion time prediction, the one or more representations including at least one of: a time duration corresponding to the current user-specific entity activity completion time prediction, a point of time corresponding to the current user-specific entity activity completion time prediction, or a description of one or more entity activities associated with the particular entity that are not completed and impact the current user-specific entity activity completion time prediction.

11. The method of claim 2, wherein the phone number information of the first plurality of phone numbers associated with the first plurality of service providers or the timing information of when the first plurality of service providers complete the delivery portions of the first plurality of activities is obtained via:

receiving, by the one or more processors, from each of a first plurality of computing devices of a first plurality of users, a permission indicator identifying a permission by each of the first plurality of users to detect communications being received by the first plurality of computing devices; and receiving, by the one or more processors, from the first plurality of computing devices, indications of communications being received from first plurality of service providers in association with completion of the delivery portions of the first plurality of activities, wherein the communications are associated with first plurality of phone numbers.

12. The method of claim 3, wherein the monitoring is performed by a browser extension of a web browser executing on the first computing device.

13. A system comprising:

a non-transient computer memory, storing software instructions; and at least one processor of a computing device;

wherein, when the at least one processor executes the software instructions, the computing device is programmed to:

obtain a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receive, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receive from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilize the trained activity completion time prediction machine learning model to determine current user-specific entity activity completion time prediction data for the current user-specific entity activity based at least in part on:

i) the current entity-specific device-executed user activity data, ii) the current user-specific entity activity data, or iii) a combination of both the current entity-specific device-executed activity data and the current user-specific entity activity data, wherein the trained activity completion time prediction machine learning model is configured to capture one or more real-time events via a browser extension associated with the first computing device;

determine a current displaying context associated with one or more current actions based on the one or more real-time events and performed by the user with the first computing device so as to notify to the user of the current user-specific entity activity completion time prediction; and instruct the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

14. The system of claim 13, wherein the trained activity completion time estimation machine learning model has been trained based on:

information of a first plurality of entities, entity activity data associated with a first plurality of activities associated with the first plurality of entities, entity-specific user activity data of a first plurality of users associated with the first plurality of activities, phone number information of a first plurality of phone numbers associated with a first plurality of service providers, the first plurality of service providers associated with delivery portions of the first plurality of activities;

timing information of when the first plurality of service providers complete the delivery portions of the first plurality of activities, timing information associated with the first plurality of activities, and at least one of:

a) profile information of the first plurality of service providers;

b) contextual information associated with the first plurality of activities;

c) profile information of the first plurality of entities; or d) contextual information associated with the entities.

15. The system of claim 13, wherein to determine a current displaying context comprises to:

monitor the one or more current actions performed by the user with the first computing device.

16. The system of claim 13, wherein the current entity-specific device-executed user activity data is received prior to when the current entity-specific user activity is confirmed with the particular entity.

17. They system of claim 13, wherein the current entity-specific device-executed user activity data is received after the current entity-specific user activity is confirmed with the particular entity.

18. The system of claim 13, wherein the current user-specific entity activity data comprises at least one of: time information related to the current user-specific entity activity, location information related to the current user-specific entity activity, traffic information related to the current user-specific entity activity, weather information related to the current user-specific entity activity, holiday information related to the current user-specific entity activity, event information related to the current user-specific entity activity, or calendar information of the user.

19. The system of claim 13, wherein the computing device is programmed to determine one or more representations for the current user-specific entity activity completion time prediction, the one or more representations including at least one of: a time duration corresponding to the current user-specific entity activity completion time prediction, a point of time corresponding to the current user-specific entity activity completion time prediction, or a description of one or more entity activities associated with the particular entity that are not completed and impact the current user-specific entity activity completion time prediction.

20. A computing device comprising:

a non-transient computer memory, storing software instructions; and at least one processor;

wherein, when the at least one processor executes the software instructions, the computing device is programmed to:

obtain a trained activity completion time estimation machine learning model that determines activity completion time prediction data for an activity of an entity based on at least one pattern between entity-specific user activity data of at least one user and entity activity data of the entity, wherein the entity-specific user activity data is indicative of past device-executed interactions by the at least one user with the entity, wherein the activity completion time prediction data is indicative of when the entity activity is to be completed by the entity;

receive, from a first computing device of a user, current entity-specific device-executed user activity data of a current entity-specific user activity associated with a particular user and a particular entity, wherein the current entity-specific user activity is associated with a current entity activity to be completed at a future point of time by a particular service provider associated with the particular entity, and wherein the current entity-specific device-executed user activity data is indicative of one or more current actions of the user with the first computing device;

receive from a second computing device associated with the particular entity, current user-specific entity activity data associated with a current user-specific entity activity, related to the current entity-specific user activity, wherein the current user-specific entity activity data is associated with data of the particular entity, data of the particular service, or both;

utilize the trained activity completion time prediction machine learning model to determine current user-specific entity activity completion time prediction data for the current user-specific entity activity based at least in part on:

i) the current entity-specific device-executed user activity data, ii) the current user-specific entity activity data, or iii) a combination of both the current entity-specific device-executed activity data and the current user-specific entity activity data, wherein the trained activity completion time prediction machine learning model is configured to capture one or more real-time events via a browser extension associated with the first computing device;

determine a current displaying context associated with one or more current actions based on the one or more real-time events and performed by the user with the first computing device so as to notify to the user of the current user-specific entity activity completion time prediction; and instruct the first computing device of the user to generate a graphical user interface (GUI), wherein the GUI comprises at least one GUI element that is configured to display the displaying context to the user so as to notify the user regarding the current user-specific entity activity completion time prediction data for the current user-specific entity activity.

\* \* \* \* \*